(12) United States Patent
Kwon et al.

(10) Patent No.: US 11,181,962 B2
(45) Date of Patent: Nov. 23, 2021

(54) PORTABLE STORAGE DEVICES AND METHODS OF OPERATING PORTABLE STORAGE DEVICES

(71) Applicant: SAMSUNG ELECTRONICS CO., LTD., Suwon-si (KR)

(72) Inventors: Jeayoung Kwon, Hwaseong-si (KR); Kyunghun Kim, Suwon-si (KR); Minseok Kim, Hwaseong-si (KR); Youngkeun Oh, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/922,091

(22) Filed: Jul. 7, 2020

(65) Prior Publication Data

US 2021/0157385 A1   May 27, 2021

(30) Foreign Application Priority Data

Nov. 27, 2019   (KR) .......................... 10-2019-0154154

(51) Int. Cl.
*G06F 1/3215* (2019.01)
*G06F 1/04* (2006.01)
(Continued)

(52) U.S. Cl.
CPC .............. *G06F 1/3215* (2013.01); *G06F 1/04* (2013.01); *G06F 9/30098* (2013.01);
(Continued)

(58) Field of Classification Search
CPC ........ G06F 1/3215; G06F 1/04; G06F 13/382; G06F 9/30098; G06F 13/4282; G06F 2213/0026; G06F 2213/0042
See application file for complete search history.

(56) References Cited

U.S. PATENT DOCUMENTS 7,519,756 B2   4/2009   Yamamoto et al.
7,679,133 B2   3/2010   Son et al.
(Continued)

FOREIGN PATENT DOCUMENTS

JP   2006-018466   1/2006
KR   10-0746308   7/2007

*Primary Examiner* — Glenn A. Auve
(74) *Attorney, Agent, or Firm* — F. Chau & Associates, LLC

(57) ABSTRACT

A portable storage device includes nonvolatile memory devices to store data, a storage controller, and a bridge chipset. The bridge chipset is connected to a first connector of a host through a cable assembly, detects a resistance of the cable assembly, provides the storage controller with USB type information of the first connector based on the detected resistance, and after a USB connection is established with the host, provides the storage controller with USB version information associated with the established USB connection. The storage controller selects one of a plurality of operation modes based on the USB type information, the USB version information, and a request pattern indicating random or sequential access to the data from the host, selects clock signals having maximum frequencies in a range within a maximum power level associated with the selected operation mode, and performs power throttling based on the selected clock signals.

20 Claims, 17 Drawing Sheets

(51) Int. Cl.
 *G06F 13/38* (2006.01)
 *G06F 9/30* (2018.01)
 *G06F 13/42* (2006.01)

(52) U.S. Cl.
 CPC ........ *G06F 13/382* (2013.01); *G06F 13/4282* (2013.01); *G06F 2213/0026* (2013.01); *G06F 2213/0042* (2013.01)

(56) References Cited

U.S. PATENT DOCUMENTS

| | | |
|---|---|---|
| 8,553,466 B2 | 10/2013 | Han et al. |
| 8,559,235 B2 | 10/2013 | Yoon et al. |
| 8,654,587 B2 | 2/2014 | Yoon et al. |
| 9,310,861 B2 | 4/2016 | Waters |
| 9,748,761 B2 | 8/2017 | Ohwaki |
| 10,587,113 B2 * | 3/2020 | Morii .................. H02H 9/02 |
| 2011/0233648 A1 | 9/2011 | Seol et al. |
| 2012/0096299 A1 | 4/2012 | Kim |
| 2013/0159608 A1 * | 6/2013 | Shin .................. G06F 3/0607 711/103 |
| 2016/0217103 A1 * | 7/2016 | Kim .................. G06F 13/4282 |
| 2017/0017598 A1 * | 1/2017 | Chou .................. G06F 11/3051 |
| 2017/0364114 A1 | 12/2017 | Sporck et al. |
| 2018/0253134 A1 * | 9/2018 | Hwang .................. G06F 13/382 |
| 2019/0025897 A1 * | 1/2019 | Atkinson ............ G06F 11/3027 |
| 2019/0319446 A1 * | 10/2019 | Mondal .................. H01R 24/62 |
| 2021/0157762 A1 * | 5/2021 | Kwon .................. G06F 13/4278 |

* cited by examiner

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | VBUS | CC1 | D+ | D− | SBU1 | VBUS | RX2− | RX2+ | GND |
| GND | RX1+ | RX1− | VBUS | SBU2 | D− | D+ | CC2 | VBUS | TX2− | TX2+ | GND |
| B12 | B11 | B10 | B9 | B8 | B7 | B6 | B5 | B4 | B3 | B2 | B1 |

| A12 | A11 | A10 | A9 | A8 | A7 | A6 | A5 | A4 | A3 | A2 | A1 |
|---|---|---|---|---|---|---|---|---|---|---|---|
| GND | RX2+ | RX2− | VBUS | SBU1 | D− | D+ | CC | VBUS | TX1− | TX1+ | GND |
| GND | TX2+ | TX2− | VBUS | VCONN |  |  | SBU2 | VBUS | RX1− | RX1+ | GND |
| B1 | B2 | B3 | B4 | B5 | B6 | B7 | B8 | B9 | B10 | B11 | B12 |

| TYPE | CABLE |
|---|---|
| 36 — TYPE C TO C | |
| 37 — C TO STANDARD A | |
| 38 — C TO B RECEPTACLE | |

| USB TYPE /VERSION | IP | REQUEST PATTERN | | |
|---|---|---|---|---|
| | | SEQ_WR_SLC | SEQ_WR_TLC | SEQ_RD |
| TYPE-C | CORE1,CORE3 | FREQ11 | FREQ21 | FREQ31 |
| | BUS | FREQ12 | FREQ22 | FREQ32 |
| | CORE2,345 | FREQ13 | FREQ23 | FREQ33 |

371a   372a   373a

370b

| USB TYPE /VERSION | IP | REQUEST PATTERN | | |
|---|---|---|---|---|
| | | SEQ_WR_SLC | SEQ_WR_TLC | SEQ_RD |
| TYPE-A USB3.0 OR UPPER | CORE1,CORE3 | FREQ41 | FREQ51 | FREQ61 |
| | BUS | FREQ42 | FREQ52 | FREQ62 |
| | CORE2,345 | FREQ43 | FREQ53 | FREQ63 |

371b   372b   373b

370c

| USB TYPE /VERSION | IP | REQUEST PATTERN | | |
|---|---|---|---|---|
| | | SEQ_WR_SLC | SEQ_WR_TLC | SEQ_RD |
| TYPE-A USB2.0 | CORE1,CORE3 | FREQ71 | FREQ81 | FREQ91 |
| | BUS | FREQ72 | FREQ82 | FREQ92 |
| | CORE2,345 | FREQ73 | FREQ83 | FREQ93 |

371c   372c   373c

PORTABLE STORAGE DEVICES AND METHODS OF OPERATING PORTABLE STORAGE DEVICES

CROSS-REFERENCE TO RELATED APPLICATIONS

This application claims priority under 35 USC § 119 to Korean Patent Application No. 10-2019-0154154, filed on Nov. 27, 2019 in the Korean Intellectual Property Office (KIPO), the disclosure of which is incorporated by reference herein in its entirety.

TECHNICAL FIELD

Exemplary embodiments relate generally to storage devices, and more particularly, to portable storage devices and methods of operating portable storage devices.

DISCUSSION OF THE RELATED ART

A data transmission standard (e.g., universal serial bus (USB)) is an industrial data bus standard used to transmit digital data between electronic devices. A transmission speed of the USB 3.1 type that is currently being used is about ten times faster than that of the USB 2.0 type. Thus, the USB 3.1 type is commonly used to transmit high-definition content. A portable storage device may be connected to various hosts supporting various USB connectors.

SUMMARY

Exemplary embodiments provide a portable storage device capable of being compatible with various hosts and capable of performing power throttling.

Exemplary embodiments provide a method of operating a portable storage device capable of being compatible with various hosts and capable of performing power throttling.

According to exemplary embodiments, a storage device includes a plurality of nonvolatile memory devices configured to store data, a storage controller, and a bridge chipset. The storage controller controls the plurality of nonvolatile memory devices. The bridge chipset is connected to a first connector of a host through a cable assembly. The bridge chipset detects a resistance of the cable assembly, provides the storage controller with universal serial bus (USB) type information of the first connector based on the detected resistance, and after a USB connection is established with the host, provides the storage controller with USB version information associated with the established USB connection. The storage controller selects one of a plurality of operation modes based on the USB type information, the USB version information, and a request pattern indicating random access to the data or sequential access to the data from the host, selects clock signals having maximum frequencies in a range within a maximum power level associated with the selected operation mode, and performs power throttling based on the selected clock signals.

According to exemplary embodiments, there is provided a method of operating a portable storage device which includes a plurality of nonvolatile memory devices configured to store data, a storage controller configured to control the plurality of nonvolatile memory devices, and a bridge chipset connected to a first connector of a host through a cable assembly connected to a second connector of the bridge chipset. According to the method, a resistance of the cable assembly is detected by the bridge chipset, universal serial bus (USB) type information of the first connector is determined based on the detected resistance, USB version information associated with an established USB connection is provided to the storage controller after the USB connection is established between the host and the portable storage device, one of a plurality of operation modes is selected by the storage controller based on the USB type information, the USB version information, and a request pattern indicating random access to the data or sequential access to the data from the host, and power throttling is performed based on the selected operation mode.

According to exemplary embodiments, a portable storage device includes a plurality of nonvolatile memory devices configured to store data, a storage controller configured to control the plurality of nonvolatile memory devices, and a bridge chipset connected to a first connector of a host through a cable assembly. The bridge chipset is configured to detect a resistance of the cable assembly, provide the storage controller with universal serial bus (USB) type information of the first connector based on the detected resistance, and after a USB connection is established with the host, provide the storage controller with USB version information associated with the established USB connection. The bridge chipset includes a connection detector configured to detect the resistance of the cable assembly via a first pin of a plurality of pins in a second connector of the portable storage device. The second connector is connected to the cable assembly. The storage controller includes an interface unit configured to perform interfacing between the host and the nonvolatile memory devices, and a power controller configured to select one of a plurality of operation modes based on the USB type information, the USB version information, and a request pattern indicating random access to the data or sequential access to the data, to select clock signals having maximum frequencies in a range within a maximum power level associated with the selected operation mode, and to perform power throttling based on the selected clock signals. The bridge chipset is configured to provide the USB type information to the storage controller through a first general purpose input/output (GPIO) pin of the connection detector, in which the first GPIO pin is hard-wired to a second GPIO pin of the storage controller, and write the USB version information in a register in a peripheral component interconnect express (PCIe) interface in the interface unit.

According to exemplary embodiments, a portable storage device includes a plurality of nonvolatile memory devices configured to store data, a storage controller configured to control the plurality of nonvolatile memory devices, and a bridge chipset connected to a first connector of a host through a cable assembly. The bridge chipset is configured to detect a resistance of the cable assembly, provide the storage controller with connection information of the first connector based on the detected resistance, and after a connection is established with the host, provide the storage controller with version information associated with the established connection. The storage controller is configured to select one of a plurality of operation modes based on USB type information, USB version information, and a request pattern indicating random access to the data or sequential access to the data from the host, select clock signals having maximum frequencies in a range within a maximum power level associated with the selected operation mode, and perform power throttling based on the selected clock signals.

Accordingly, the portable storage device may optimize power by adaptively controlling power based on the USB type of the first connector of the host, connected through the cable assembly, USB version information between the portable storage device and the host, and a request pattern from the host. In addition, the portable storage device may improve performance by controlling frequencies of the clock signals in a starting stage of the initializing operation.

BRIEF DESCRIPTION OF THE DRAWINGS

The above and other features of the present disclosure will become more apparent by describing in detail exemplary embodiments thereof with reference to the accompanying drawings, in which:

FIG. 9 illustrates an example of a look-up table (LUT) in FIG. 8A according to exemplary embodiments.

DETAILED DESCRIPTION OF THE EXEMPLARY EMBODIMENTS

Figure 1:
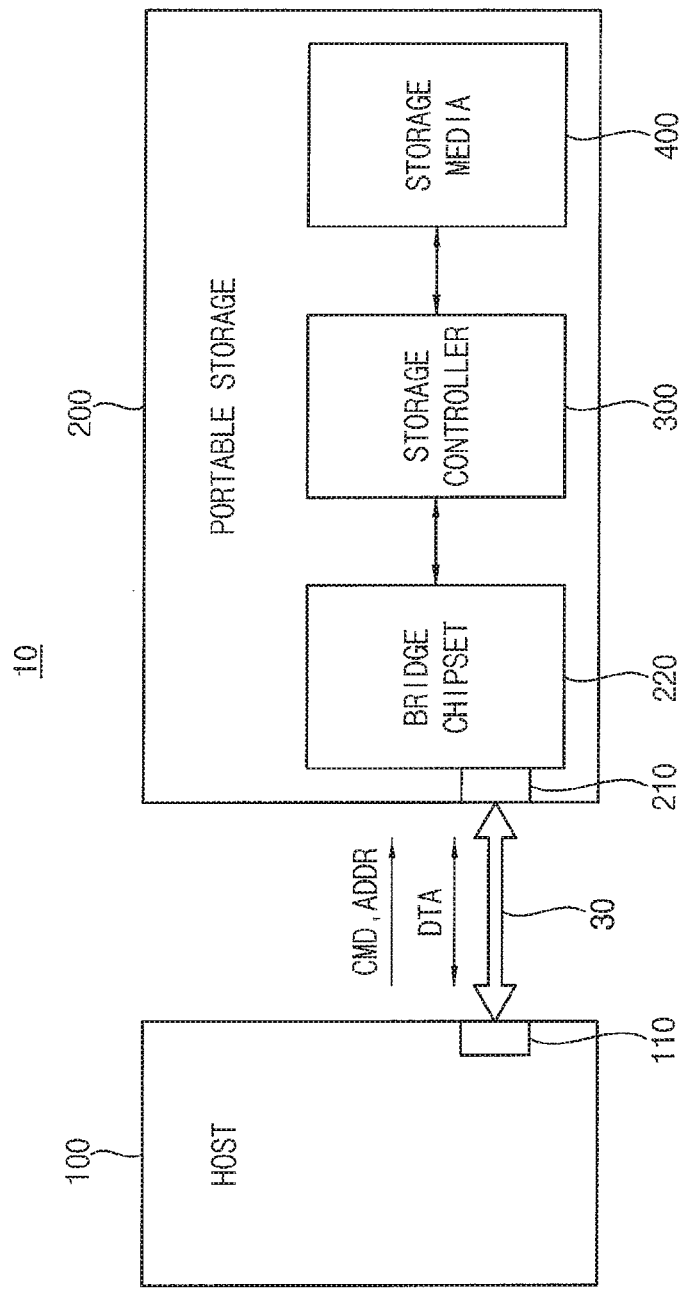
FIG. 1 is a block diagram illustrating a storage system according to exemplary embodiments.

Exemplary embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

It should be understood that descriptions of features or aspects within each exemplary embodiment should typically be considered as available for other similar features or aspects in other exemplary embodiments, unless the context clearly indicates otherwise.

As used herein, the singular forms "a", "an" and "the" are intended to include the plural forms as well, unless the context clearly indicates otherwise.

Herein, when one value is described as being about equal to another value or being substantially the same as or equal to another value, it is to be understood that the values are identical, the values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art.

FIG. 1 is a block diagram illustrating a storage system according to exemplary embodiments.

Referring to FIG. 1, a storage system 10 may include a host 100 and a portable storage device 200.

The host 100 and the portable storage device 200 may be electrically connected to each other, and may communicate with each other, through a universal serial bus (USB) cable assembly 30. The USB cable assembly 30 may also be referred to as a cable assembly 30.

In exemplary embodiments, the host 100 may be connected to the cable assembly 30 through a first connector 110, and the portable storage device 200 may be connected to the cable assembly 30 through a second connector 210.

The host 100 may include at least one of, for example, a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device.

In exemplary embodiments, the host 100 may include at least one of various medical devices such as, for example, diverse portable medical measuring devices (e.g., a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device. In exemplary embodiments, the host 100 may include, for example, a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics devices, security devices, vehicular head units, industrial or home robots, drones, automatic teller machines (ATMs), or point of sales (POS) devices.

The first connector 110 may also be referred to as a first receptacle, and the second connector 210 may also be referred to as a second receptacle.

The host 100 may provide a command CMD and an address ADDR to the portable storage device 200 through the cable assembly 30, and may exchange data DTA with the portable storage device 200 through the cable assembly 30.

In FIG. 1, the portable storage device 200 is illustrated as a solid state drive (SSD) device as an example. However, exemplary embodiments are not limited thereto. For example, according to exemplary embodiments, the portable storage device 200 may be any kind of portable storage device.

The portable storage device 200 may include a bridge chipset 220 (which may also be referred to herein as a bridge chipset circuit), a storage controller 300 (which may also be referred to herein as a storage controller circuit), and a storage media 400. The storage media 400 may include a plurality of nonvolatile memory devices. The plurality of nonvolatile memory devices may be used as a storage medium of the portable storage device 200.

In exemplary embodiments, each of the plurality of nonvolatile memory devices 400a~400k (see FIG. 5) may include a flash memory or a vertical NAND memory device. The storage controller 300 may control each of the plurality of nonvolatile memory devices 400a~400k.

When the bridge chipset 220 is connected to the first connector 110 of the host 100 through the cable assembly 30, the bridge chipset 220 may receive power from the host 100 and may detect a resistance of the cable assembly 30. In addition, the bridge chipset 220 may determine a USB type of the cable assembly 30 and/or the first connector 110 based on the detected resistance, and may provide the storage controller 300 with USB type information indicating the determined USB type.

The bridge chipset 220 may notify the USB type information of the storage controller 300 by selectively toggling a general purpose input/output (GPIO) pin based on the detected resistance.

In addition, when a USB connection of the portable storage device 200 with the host 100 is established (e.g., when a USB link is established between the host 100 and the portable storage device 200), the bridge chipset 220 may provide the storage controller 300 with USB version information indicating USB protocol information between the host 100 and the portable storage device 200.

The storage controller 300 may perform power throttling within a power level associated with an operation involved in a request pattern based on the USB type information, the USB version information, and the request pattern indicating random access to the data or sequential access to the data from the host 100. The storage controller 300 may select one of a plurality of operation modes based on the USB type information, the USB version information and the request pattern, and may perform the power throttling to adjust a level of a voltage consumed in an operation corresponding to the selected operation mode.

That is, the storage controller 300 may select frequencies of clock signals to be provided to hardware modules in the storage controller 300 such that a power target level associated with the selected operation mode is not exceeded.

Figures 2, 3A, 3B:
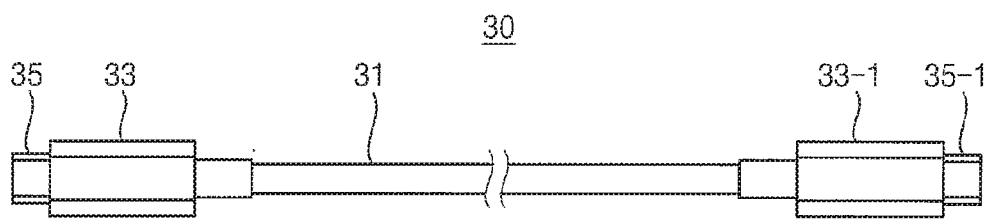
FIG. 2 illustrates an example of a cable assembly in FIG. 1 according to exemplary embodiments.
FIG. 3A illustrates a first connector in FIG. 1 according to exemplary embodiments.
FIG. 3B illustrates a plug in FIG. 2 according to exemplary embodiments.

FIG. 2 illustrates an example of the cable assembly 30 in FIG. 1 according to exemplary embodiments.

Referring to FIG. 2, the cable assembly 30 may include a cable 31, a first overmold 33, a second overmold 33-1, a first plug 35 and a second plug 35-1.

The first plug 35 may be connected to the cable 31 through the first overmold 33, and the second plug 35-1 may be connected to the cable 31 through the second overmold 33-1.

FIG. 3A illustrates the first connector 110 in FIG. 1 according to exemplary embodiments. FIG. 3B illustrates a plug in FIG. 2 according to exemplary embodiments.

Referring to FIG. 3A, the first connector 110, which can be connected to the first plug 35, may include 24 pins A1 to A12 and B1 to B12. Pins may also be referred to as contacts.

A first group of pins A1 to A12 may be disposed symmetrically with a second group of pins B1 to B12 with respect to a center portion of the first plug 35.

For example, the first connector 110 may include first GND pins A1, A12, B1, and B12, first USB 3.1 transmitter pins A2, A3, B2, and B3, first USB 3.1 receiver pins A10, A11, B10, and B11, first VBUS pins A4, A9, B4, and B9, first CC pins A5 and B5, first USB 2.0 signal pins A6, A7, B6, and B7, and first side pins A8 and B8.

Referring to FIG. 3B, the first plug 35 or the second plug 35-1 may include 24 pins A1 to A12 and B1 to B12 corresponding to respective pins of the first connector 110.

For example, the first plug 35 or the second plug 35-1 may include second GND pins A1, A12, B1, and B12, second USB 3.1 transmitter pins A2, A3, B2, and B3, second USB 3.1 receiver pins A10, A11, B10, and B11, second VBUS pins A4, A9, B4, and B9, a second CC pin A5, a VCONN pin B5, second USB 2.0 signal pins A6 and A7, and second side pins A8 and B8.

The first USB 3.1 transmitter pins A2, A3, B2, and B3 of the first connector 110 may be connected to the first USB 3.1 transmitter pins A2, A3, B2, and B3 of the first plug 35, and the first USB 3.1 receiver pins A10, A11, B10, and B11 of the first connector 110 may be connected to the second USB 3.1 transmitter pins A2, A3, B2, and B3 of the first plug 35, thereby transmitting or receiving data between the first connector 110 and the first plug 35 or the second plug 35-1 according to the USB 3.1 protocol. Each of the first CC pins A5 and B5 of the first connector 110 may be connected to the second CC pin A5 or the VCONN pin B5 of the first plug 35 or the second plug 35-1.

Configurations of the first connector 110 and the first plug 35 or the second plug 35-1 are examples according to USB type-C. Configurations of the first connector 110 and the first plug 35 or the second plug 35-1 may be changed according to the USB type.

In exemplary embodiments, pin assignment of the second connector 210 may be the same as or similar with the pin assignment of the first connector 110.

In exemplary embodiments, the host 100 supporting the USB interface may define insertion direction of the first plug 35 connected to the first connector 110, and whether the portable storage device 200 connected to the first connector 110 through the cable assembly 30 operates as a USB device or as a USB host, by measuring a voltage of the CC pin (identification pin) of the host 100.

That is, the CC (CC1 or CC2) pin may be used for at least one of detecting connection of the portable storage device 200 through the cable assembly 30, determining the insertion direction of the first plug 35, and managing a configuration of the storage system 10 (e.g., managing a configuration of the host 100 and the portable storage device 200).

As such, to recognize the insertion direction of the first plug 35 and to define whether the external device connected to the first connector 110 and the cable assembly 30 is the USB device or the USB host by measuring the voltage of the CC pin, a specified current may always be applied to the CC pin. The specified current, which may be supplied by the host 100, may be varied according to the USB type of the first connector 110.

Figures 3C, 4:
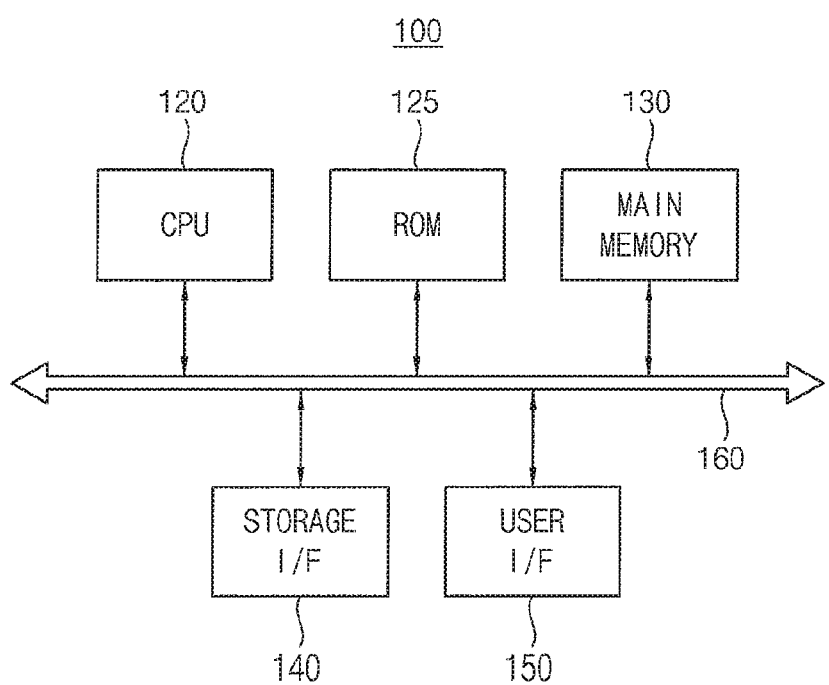
FIG. 3C is a table illustrating types of a cable assembly in FIG. 1 according to exemplary embodiments.
FIG. 4 is a block diagram illustrating a host in FIG. 1 according to exemplary embodiments.

FIG. 3C is a table illustrating types of the cable assembly in FIG. 1 according to exemplary embodiments.

Referring to FIG. 3C, the (USB) type of the cable assembly 30 complies with "TYPE C to C" as reference numeral 36 indicates, complies with "TYPE C to STANDARD A" as reference numeral 37 indicates, or complies with "TYPE C to RECEPTACLE B" as reference numeral 38 indicates.

In exemplary embodiments, the cable assembly 30 in FIG. 1 does not comply with a USB type. In this case, the bridge chipset 220 may detect a resistance of the cable assembly 30, may provide the storage controller 300 with connection information of the first connector 110 based on the detected resistance, and may provide the storage controller 300 with version information associated with the established connection after a connection is established with the host 100. The storage controller 300, independently from the host 100, may select clock signals having frequencies in a range within a maximum power level associated with the selected initializing mode and may perform an initializing operation based on the selected clock signals within an internal reference time interval.

FIG. 4 is a block diagram illustrating the host 100 in FIG. 1 according to exemplary embodiments.

Referring to FIG. 4, the host 100 may include a central processing unit (CPU) 120, a read-only memory (ROM) 125, a main memory 130, a storage interface 140, a user interface 150, and a bus 160.

The bus 160 may refer to a transmission channel via which data is transmitted between the CPU 120, the ROM 125, the main memory 130, the storage interface 140, and the user interface 150 of the host 100.

The ROM 125 may store various application programs. For example, application programs supporting storage protocols such as Advanced Technology Attachment (ATA), Small Computer System Interface (SCSI), embedded Multi Media Card (eMMC), and/or Unix File System (UFS) protocols may be stored.

The main memory 130 may temporarily store data or programs.

The user interface 150 may be a physical or virtual medium for exchanging information between a user and the host 100, a computer program, etc., and may include physical hardware and logical software. For example, the user interface 150 may include an input device for allowing the user to manipulate the host 100, and an output device for outputting a result of processing an input of the user.

The CPU 120 may control overall operations of the host 100. The CPU 120 may generate a command for storing data in the portable storage device 200 or a request (or a command) for reading data from the portable storage device 200 by using an application stored in the ROM 125, and may transmit the request to the portable storage device 200 via the storage interface 140.

Figure 5:
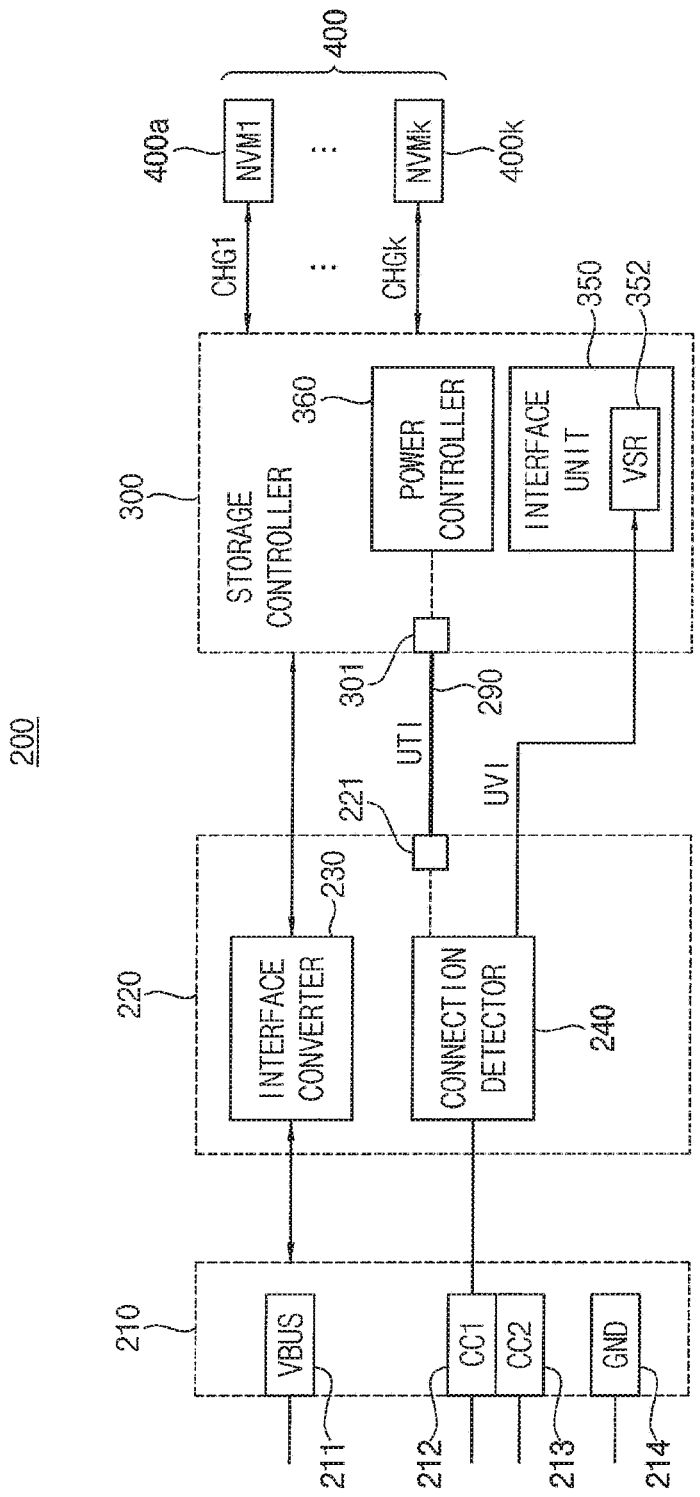
FIG. 5 is a block diagram illustrating an example of a portable storage device in FIG. 1 according to exemplary embodiments.

FIG. 5 is a block diagram illustrating an example of the portable storage device 200 in FIG. 1 according to exemplary embodiments.

Referring to FIG. 5, the portable storage device 200 may include a second connector 210 connected to the cable assembly 30, the bridge chipset 220, the storage controller 300 and the storage media 400.

The storage media 400 may include a plurality of nonvolatile memory devices 400*a*~400*k* (where k is an integer greater than two). The storage controller 300 may be connected to the plurality of nonvolatile memory devices 400*a*~400*k* through a plurality of channels CHG1~CHGk (where k is an integer greater than two), respectively.

The second connector 210 may include a plurality of pins, and the plurality of pins may include a cable bus power (VBUS) pin 211 for supplying power, CC1 and CC2 pins 212 and 213 for exchanging setting information with the host 100, and a ground (GND) pin 214.

The bridge chipset 220 may be connected to the second connector 210. The bridge chipset 220 may include an interface converter 230 (which may also be referred to herein as an interface converter circuit) and a connection detector 240 (which may also be referred to herein as a connection detector circuit).

The interface converter 230 may perform interface converting between the host 100 and the storage controller 300. For example, the interface converter 230 may convert an interface of the host 100 to an interface conformed to the plurality of nonvolatile memory devices 400*a*~400*k*, or may convert an interface conformed to the plurality of nonvolatile memory devices 400*a*~400*k* to an interface of the host 100.

The connection detector 240 is connected to the CC1 pin 212, detects a resistance of the cable assembly 30 and the first connector 110 in response to power being applied to the cable assembly 30 when the cable assembly 30 is connected to the first connector 110 of the host 100, determines a USB type of the cable assembly 30 and the first connector 110 based on the detected resistance, and provides the storage controller 300 with USB type information UTI indicating the USB type of the cable assembly 30 and the first connector 110.

When the cable assembly 30 is connected to the first connector 110 of the host 100 and power is applied to the cable assembly 30, a specified current applied to the CC1 pin of the first connector 110 is provided to the CC1 pin 212 through the cable assembly 30, and a voltage based on the current is induced at the CC1 pin 212. The connection detector 240 may detect the resistance of the cable assembly 30 and the first connector 110 by detecting a voltage of the CC1 pin 212.

The connection detector 240 may determine the USB type of the cable assembly 30 and the first connector 110 based on a comparison of the detected resistance with a threshold value. In exemplary embodiments, when the detected resistance is smaller than or equal to the threshold value, the connection detector 240 may determine the USB type of the first connector 110 as USB type-C, and when the detected resistance is greater than the threshold value, the connection detector 240 may determine the USB type of the first connector 110 as USB type-A.

In exemplary embodiments, the connection detector 240 may provide the USB type information UTI to a power controller 360 of the storage controller 300 through a first GPIO pin 221. The connection detector 240 may selectively toggle a voltage of the first GPIO pin 221 based on the detected resistance.

When the detected resistance is smaller than or equal to the threshold value, the connection detector 240 may notify the storage controller 300 of the USB type of the first connector 110 being USB type-C by maintaining the voltage level of the first GPIO pin 221 at a first level.

When the detected resistance is greater than the threshold value, the connection detector 240 may notify the storage controller 300 of the USB type of the first connector 110 being USB type-C by toggling the voltage of the first GPIO pin 221 from the first level to a second level.

The storage controller 300 may include the power controller 360 (which may also be referred to herein as a power controller circuit) and an interface unit 350 (which may also be referred to herein as an interface circuit). The interface unit 350 may include a register 352. The register 352 may be a vendor specific register (VSR).

The power controller 360 may be connected to a second GPIO pin 301 of the storage controller 300. The second GPIO pin 301 may be hard-wired connected to the first GPIO pin 221 through a wire 290.

After the connection is established with the host 100, the connection detector 240 may provide the storage controller 300 with USB version information UVI associated with the established connection.

The connection detector 240 may write the USB version information UVI in the register 352 and may obtain the USB version information UVI by referring to the register 352 in response to a write event in the register 352. The bridge chipset 220 and the storage controller 300 may communicate with each other via side-band communication through the first GPIO pin 221 and the second GPIO pin 301, respectively. The connection detector 240 and the register 352 in the interface unit 350 may communicate with each other via in-band communication and through a non-nonvolatile memory express (NVMe) interface.

Figure 6:
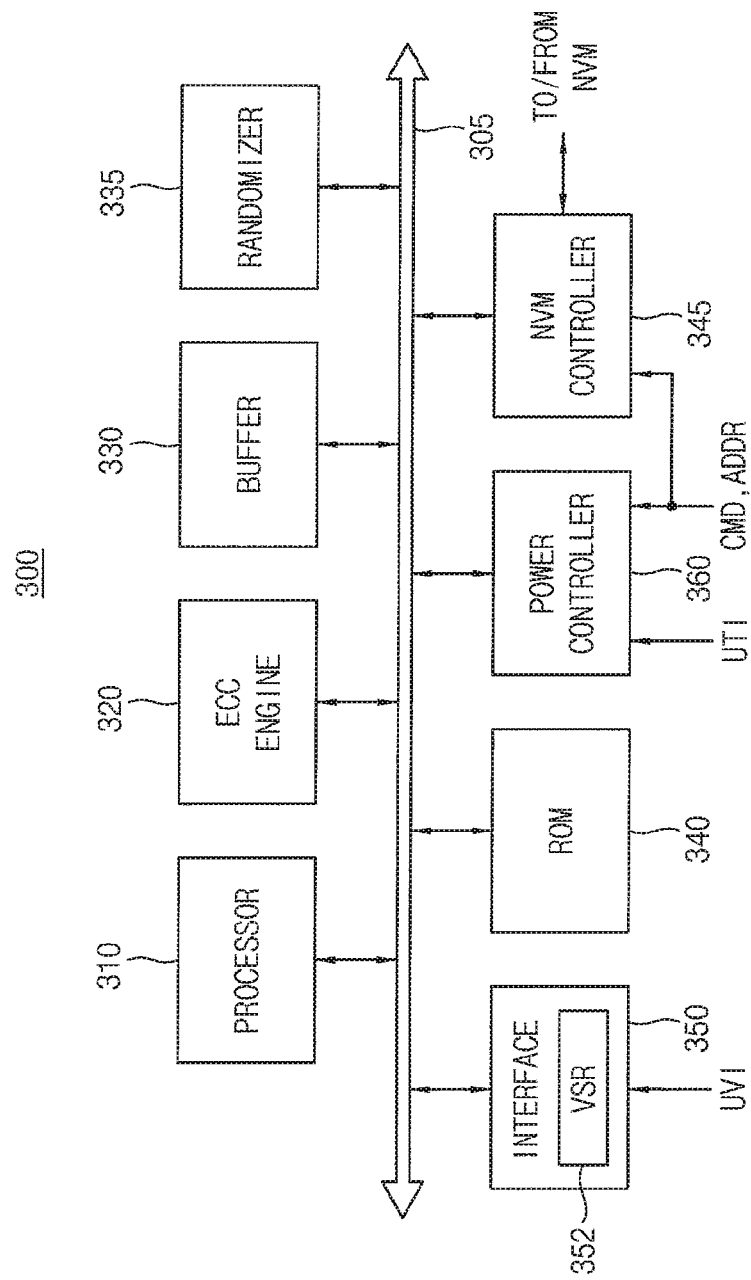
FIG. 6 is a block diagram illustrating an example of a storage controller in FIG. 5 according to exemplary embodiments.

FIG. 6 is a block diagram illustrating an example of the storage controller 300 in FIG. 5 according to exemplary embodiments.

Referring to FIG. 6, the storage controller 300 may include a processor 310, an error correction code (ECC) engine 320 (which may also be referred to herein as an ECC engine circuit), a buffer 330 (which may also be referred to herein as a buffer circuit), a randomizer 335 (which may also be referred to herein as a randomizer circuit), a ROM 340, an interface unit 350 (which may also be referred to herein as an interface circuit), a power controller 360 (which may also be referred to herein as a power controller circuit), and a nonvolatile controller 345 (which may also be referred to herein as a nonvolatile controller circuit), which are connected to one another via a bus 305.

The processor 310 controls an overall operation of the storage controller 300. The processor 310 may include a plurality of cores.

The plurality of cores may perform control operations associated with the nonvolatile memory devices 400a~400k. At least one of the plurality of cores may process a command provided from the host 100, at least one of the plurality of cores may perform address mapping and garbage collection using a flash translation layer (FTL), and at least one of the plurality of cores may control the nonvolatile memory devices 400a~400k through the nonvolatile controller 345.

Memory cells of the nonvolatile memory devices 400a~400k may have the physical characteristic that a threshold voltage distribution varies due to causes, such as, for example, a program elapsed time, a temperature, program disturbance, read disturbance, etc. For example, data stored in the nonvolatile memory devices 400a~400k may become corrupt due to the above causes.

The storage controller 300 utilizes a variety of error correction techniques to correct such errors. For example, the storage controller 300 may include the ECC engine 320.

The ECC engine 320 may correct errors which occur in the data stored in the nonvolatile memory devices 400a~400k.

The ROM 340 stores a variety of information used for the storage controller 300 to operate, in firmware. The buffer 330 may store data provided from the nonvolatile memory devices 400a~400k.

The randomizer 335 randomizes data to be stored in the nonvolatile memory devices 400a~400k. For example, the randomizer 335 may randomize data to be stored in the nonvolatile memory devices 400a~400k in a unit of a word line.

Data randomizing may be performed to process data such that program states of memory cells connected to a word line have the same ratio.

For example, if memory cells connected to one word line are multi-level cells (MLC) each storing 2-bit data, each of the memory cells has one of an erase state and first through third program states.

In this case, the randomizer 335 may randomize data such that in memory cells connected to one word line, the number of memory cells having the erase state, the number of memory cells having the first program state, the number of memory cells having the second program state, and the number of memory cells having the third program state are the same as or substantially the same as one another. For example, memory cells in which randomized data is stored have program states of which the number is equal to one another.

The randomizer 335 further de-randomizes data read from the nonvolatile memory devices 400a~400k.

The interface unit 350 may perform interfacing between the host 100 and the nonvolatile memory devices 400a~400k.

The interface unit 350 includes the register 352, and the register 352 may store the USB version information UVI.

The power controller 360 may receive the USB type information UTI, may receive the command CMD and the address ADDR, may determine a request pattern based on the command CMD and the address ADDR, may select one of a plurality of operation modes based on the USB type information UTI, the USB version information UVI and the request pattern, and may perform power throttling to adjust power level consumed in the selected operation mode.

The nonvolatile controller 345 may receive the command CMD and the address ADDR, and may control the nonvolatile memory devices 400a~400k based on the command CMD and the address ADDR.

Figure 7:
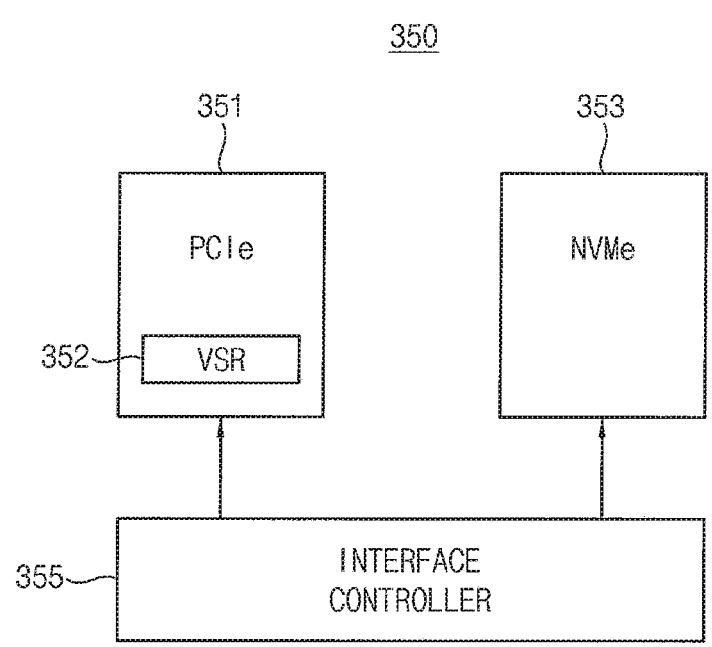
FIG. 7 illustrates an example of an interface unit in the storage controller of FIG. 6 according to exemplary embodiments.

FIG. 7 illustrates an example of the interface unit 350 in the storage controller 300 of FIG. 6 according to exemplary embodiments.

Referring to FIG. 7, the interface unit 350 may include a peripheral component interconnect express (PCIe) interface 351, a nonvolatile memory express (NVMe) interface 353, and an interface controller 355. The PCIe interface 351 may include the register 352.

The interface controller 355 may control the PCIe interface 351 and the NVMe interface 353.

The PCIe interface 351 may be a communication path through which commands and data are transmitted and received according to a PCIe protocol. The NVMe interface 353 may be a communication path through which commands and data are transmitted and received according to an NVMe protocol. The NVMe protocol may be supported by the PCIe protocol. Therefore, the NVMe interface 353 may transmit/receive the commands and the data via the PCIe interface 351.

Figure 8A:
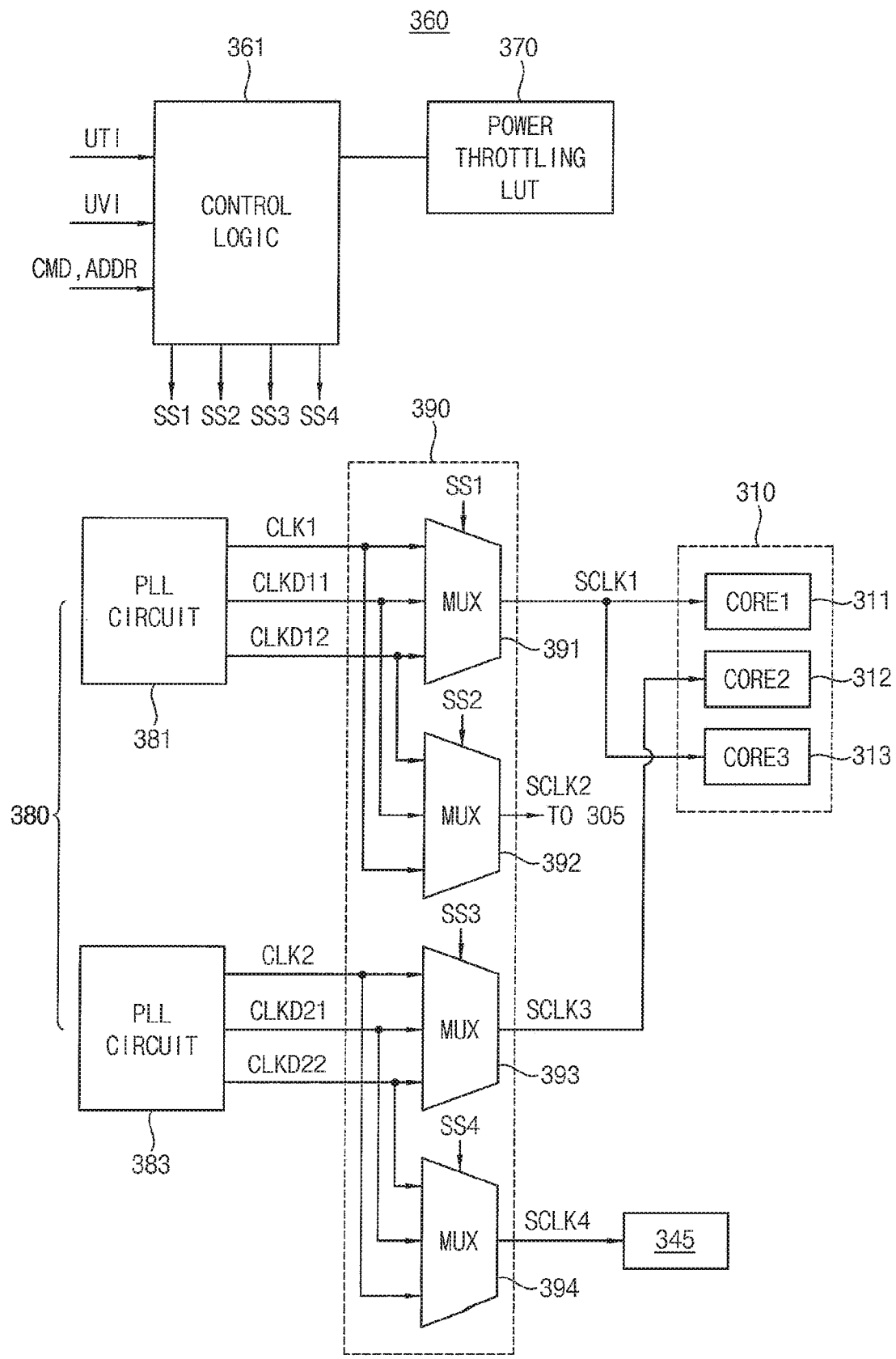
FIG. 8A illustrates an example of a power controller in the storage controller of FIG. 6 according to exemplary embodiments.

FIG. 8A illustrates an example of the power controller 360 in the storage controller 300 of FIG. 6 according to exemplary embodiments.

Referring to FIG. 8A, the power controller 360 may include a control logic 361 (which may also be referred to herein as a control logic circuit), a power throttling look-up table (LUT) 370, a clock generator 380 (which may also be referred to herein as a clock generator circuit), and a selection circuit 390. The power throttling LUT 370 may also be referred to as an LUT.

The clock generator 380 may include phase-locked loop (PLL) circuits 381 and 383, and the selection circuit 390 may include multiplexers 391, 392, 393 and 394.

In FIG. 8A, the processor 310 including a plurality of cores 311, 312 and 313, and the nonvolatile controller 345, are also illustrated for convenience of explanation.

The core 311 may process a command provided from the host 100, the core 312 may perform address mapping and garbage collection using FTL, and the core 313 may control the nonvolatile memory devices 400a~400k through the nonvolatile controller 345.

The control logic 361 may access the LUT 370 based on the USB type information UTI, the USB version information UVI, and the request pattern, which are based on the command CMD and the address ADDR, and may generate selection signals SS1, SS2, SS3 and SS4 by referring to entries in the LUT 370.

The LUT 370 may store information on power targets associated with a plurality of operation modes. In exemplary embodiments, the LUT 370 may store information on frequencies of clock signals provided to the cores 311, 312 and 313, the system bus 305, and the nonvolatile controller 345 in each of the plurality of operation modes.

The PLL circuit 381 may generate a base clock signal CLK1 having a first frequency and divided clock signals CLKD11 and CLKD12 by dividing the base clock signal CLK1.

The PLL circuit 383 may generate a base clock signal CLK2 having a second frequency and divided clock signals CLKD21 and CLKD22 by dividing the base clock signal CLK2.

The multiplexer 391 may select one of the base clock signal CLK1 and the divided clock signals CLKD11 and CLKD12 as a first selected clock signal SCLK1 in response to a first selection signal SS1, and may provide the first selected clock signal SCLK1 to the cores 311 and 313.

The multiplexer 392 may select one of the base clock signal CLK1 and the divided clock signals CLKD11 and CLKD12 as a second selected clock signal SCLK2 in response to a second selection signal SS2, and may provide the second selected clock signal SCLK2 to the system bus 305.

The multiplexer 393 may select one of the base clock signal CLK2 and the divided clock signals CLKD21 and CLKD22 as a third selected clock signal SCLK3 in response to a third selection signal SS3, and may provide the third selected clock signal SCLK3 to the core 312.

The multiplexer 394 may select one of the base clock signal CLK2 and the divided clock signals CLKD21 and CLKD22 as a fourth selected clock signal SCLK4 in response to a fourth selection signal SS4, and may provide the fourth selected clock signal SCLK4 to the nonvolatile controller 345.

Figure 8B:
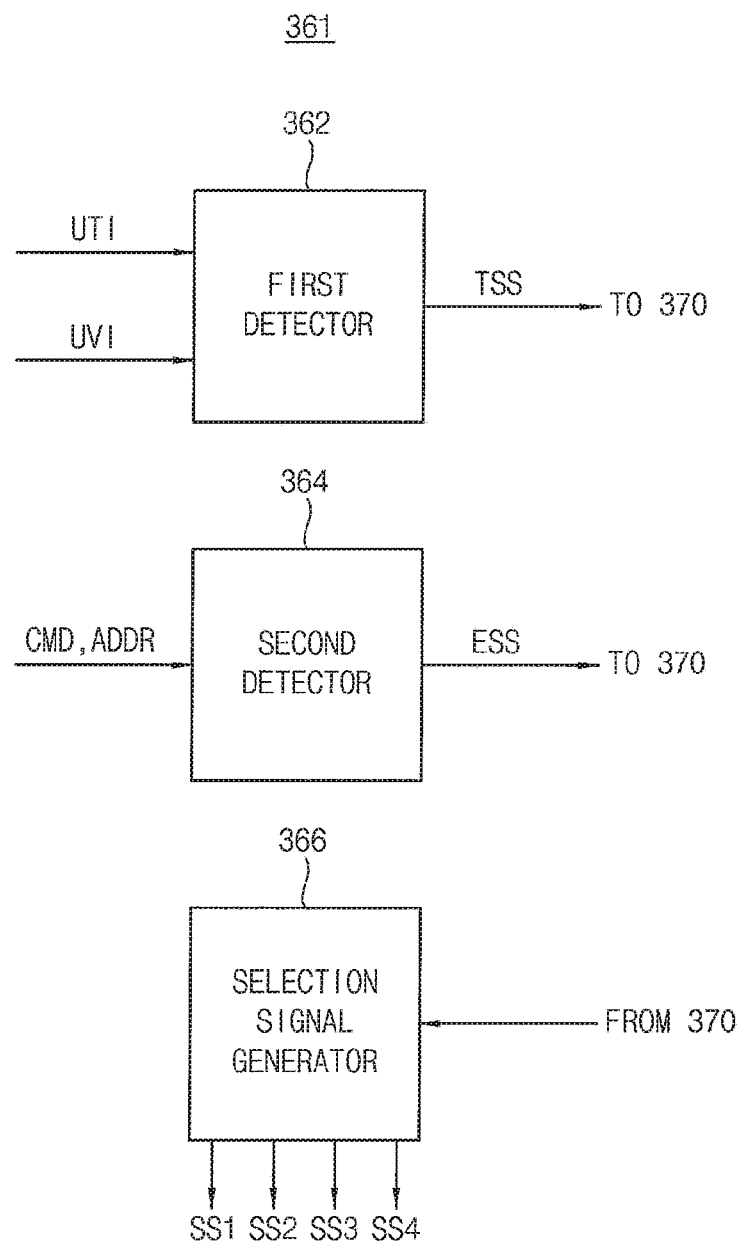
FIG. 8B is a block diagram illustrating an example of a control logic in FIG. 8A according to exemplary embodiments.

FIG. 8B is a block diagram illustrating an example of the control logic 361 in FIG. 8A according to exemplary embodiments.

Referring to FIG. 8B, the control logic 361 may include a first detector 362 (which may also be referred to herein as a first detector circuit), a second detector 364 (which may also be referred to herein as a second detector circuit), and a selection signal generator 366 (which may also be referred to herein as a selection signal generator circuit).

The first detector 362 may generate a table selection signal TSS for selecting one of a plurality of sub-tables included in the LUT 370 based on the USB type information UTI and the USB version information UVI. The second detector 364 may detect the request pattern based on the command CMD and the address ADDR to generate an entry selection signal ESS for selecting one of a plurality of entries of the selected sub-table. The selection signal generator 366 may generate the selection signals SS1, SS2, SS3 and SS4 by referring to content stored in the selected entry of the selected sub-table.

FIG. 9 illustrates an example of the LUT 370 in FIG. 8A according to exemplary embodiments.

Referring to FIG. 9, the LUT 370 may include a plurality of sub-tables 370a, 370b and 370c corresponding to the USB type information UTI and the USB version information UVI.

The first sub-table 370a may include entries 371a, 372a and 373a corresponding to the operation mode associated with the request pattern when the USB type information UTI corresponds to USB type-C.

The entry 371a may store operating frequencies FREQ11, FREQ12 and FREQ13 of clock signals provided to the cores 311 and 313, the system bus 305, and the core 312 and the nonvolatile controller 345, respectively, when the request pattern indicates a sequential write operation to single level cells SEQ_WR_SLC. The entry 372a may store operating frequencies FREQ21, FREQ22 and FREQ23 of clock signals provided to the cores 311 and 313, the system bus 305, and the core 312 and the nonvolatile controller 345, respectively, when the request pattern indicates a sequential write operation to triple level cells SEQ_WR_TLC. The entry 373a may store operating frequencies FREQ31, FREQ32 and FREQ33 of clock signals provided to the cores 311 and 313, the system bus 305, and the core 312 and the nonvolatile controller 345, respectively, when the request pattern indicates a sequential read operation SEQ_RD.

The second sub-table 370b may include entries 371b, 372b and 373b corresponding to the operation mode associated with the request pattern when the USB type information UTI corresponds to USB type-A and the USB type information UVI corresponds to USB 3.0 or higher.

The entry 371b may store operating frequencies FREQ41, FREQ42 and FREQ43 of clock signals provided to the cores 311 and 313, the system bus 305, and the core 312 and the nonvolatile controller 345, respectively, when the request pattern indicates a sequential write operation to single level cells SEQ_WR_SLC. The entry 372b may store operating frequencies FREQ51, FREQ52 and FREQ53 of clock signals provided to the cores 311 and 313, the system bus 305, and the core 312 and the nonvolatile controller 345, respectively, when the request pattern indicates a sequential write operation to triple level cells SEQ_WR_TLC. The entry 373b may store operating frequencies FREQ61, FREQ62 and FREQ63 of clock signals provided to the cores 311 and 313, the system bus 305, and the core 312 and the nonvolatile controller 345, respectively, when the request pattern indicates a sequential read operation SEQ_RD.

The third sub-table 370c may include entries 371c, 372c and 373c corresponding to the operation mode associated with the request pattern when the USB type information UTI corresponds to USB type-A and the USB type information UVI corresponds to USB 2.0.

The entry 371c may store operating frequencies FREQ71, FREQ72 and FREQ73 of clock signals provided to the cores 311 and 313, the system bus 305, and the core 312 and the nonvolatile controller 345, respectively, when the request pattern indicates a sequential write operation to single level cells SEQ_WR_SLC. The entry 372c may store operating frequencies FREQ81, FREQ82 and FREQ83 of clock signals provided to the cores 311 and 313, the system bus 305, and the core 312 and the nonvolatile controller 345, respectively, when the request pattern indicates a sequential write operation to triple level cells SEQ_WR_TLC. The entry 373c may store operating frequencies FREQ91, FREQ92 and FREQ93 of clock signals provided to the cores 311 and 313, the system bus 305, and the core 312 and the nonvolatile controller 345, respectively, when the request pattern indicates a sequential read operation SEQ_RD.

Each of the sub-tables 370a, 370b and 370c in FIG. 9 may further store information about frequencies of the clock signals in a random write operation and a random read operation.

The control logic 361 may generate the selection signals SS1, SS2, SS3 and SS4 by referring to information of operating frequencies of the clock signals associated with each of the operation modes, and may provide the selection signals SS1, SS2, SS3 and SS4 to the multiplexers 391, 392, 393 and 394.

When the USB type information UTI corresponds to USB type-C, the control logic 361 generates the selection signals SS1, SS2, SS3 and SS4 such that clock signals having frequencies associated with an operation mode corresponding to a maximum power target among the plurality of operation modes are selected.

When the USB type information does not correspond to USB type-C and the USB version information corresponds to USB 3.0 or higher, the control logic 361 generates the selection signals SS1, SS2, SS3 and SS4 such that clock signals having frequencies associated with an operation mode corresponding to an intermediate power target among the plurality of operation modes are selected. The intermediate power target may be greater than a minimum power target and may be smaller than a maximum power target.

When the USB type information UTI corresponds to USB type-A and the USB version information does not correspond to USB 3.0 or higher, the control logic 361 generates the selection signals SS1, SS2, SS3 and SS4 such that clock signals having frequencies associated with an operation mode corresponding to a minimum power target among the plurality of operation modes are selected.

Figure 10:
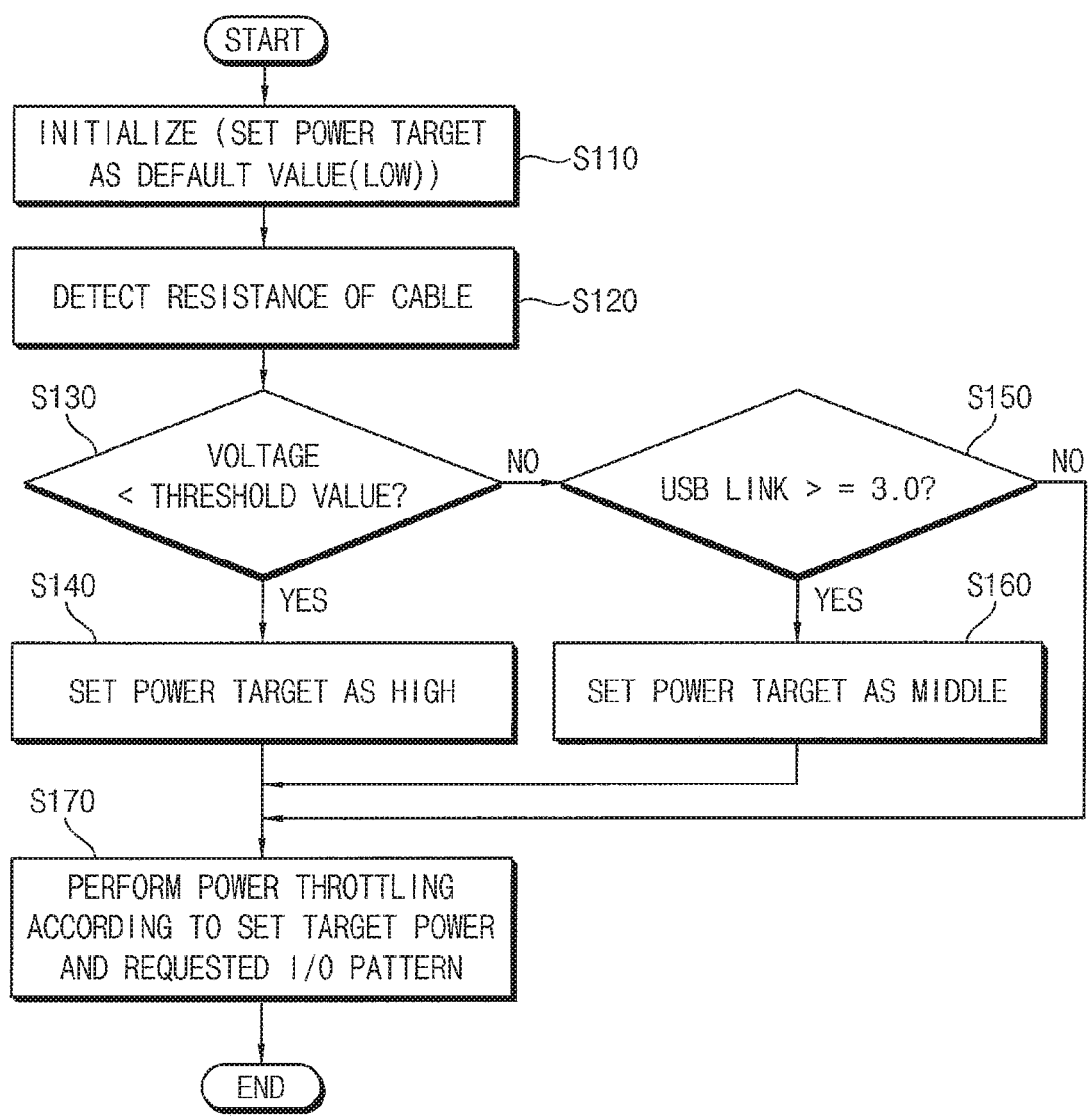
FIG. 10 illustrates an operation of a storage controller in FIG. 5 according to exemplary embodiments.

FIG. 10 illustrates an operation of the storage controller 300 in FIG. 5 according to exemplary embodiments.

Referring to FIGS. 5 through 10, in exemplary embodiments, when power is applied to the portable storage device 200, the power controller 360 performs an initializing operation by setting a power target as the first power target corresponding to a default value (S110). The power controller 360 selects a first initializing mode corresponding to the first power target, of the plurality of initializing modes. Because the power controller 360 cannot obtain the USB type information of the first connector 110 and the USB version information associated with established connection at an instance when the power is applied to the portable storage device 200, the power controller 360 performs the initializing operation by setting the first power target of a plurality of power targets. The first power target may have a minimum power level from among the plurality of power targets.

The connection detector 240 in the bridge chipset 220 detects a resistance of the cable assembly 30 by detecting a voltage of the CC1 pin 212 (S120). The connection detector 240 determines whether the voltage of the CC1 pin 212 is smaller than or equal to a threshold value based on a comparison of the voltage of the CC1 pin 212 with the threshold value (S130).

When the voltage of the CC1 pin 212 is smaller than the threshold value (YES in S130), the USB type of the cable assembly 30 is USB type-C and the power controller 360 performs an initializing operation by setting the power target as the second power target (HIGH) (S140). The power controller 360 selects a second initializing mode corresponding to the second power target of the plurality of initializing modes. The second power target may have a maximum power level from among the plurality of power targets.

When the voltage of the CC1 pin 212 is greater than the threshold value (NO in S130), the USB type of the cable assembly 30 is USB type-A, and thus the connection detector 240 determines whether the USB version information (e.g., the USB link) corresponds to USB 3.0 or higher (S150).

When the USB version information corresponds to USB 3.0 or higher (YES in S150), the power controller 360 performs an initializing operation by setting the power target as the third power target (MIDDLE) (S160). The power controller 360 selects a third initializing mode corresponding to the third power target of the plurality of initializing modes. The third power target may have a power level greater than the minimum power level and smaller than the maximum power level, and thus, the third power target may also be referred to as an intermediate or middle power target.

When the USB version information does not correspond to USB 3.0 or higher (NO in S150), the power controller 360 maintains the first initializing mode.

The controller 360 selects one of a plurality of operation modes based on a target level in the selected initializing mode and the request pattern from the host 100, and performs power throttling based on the selected operation mode (S170).

Figure 11:
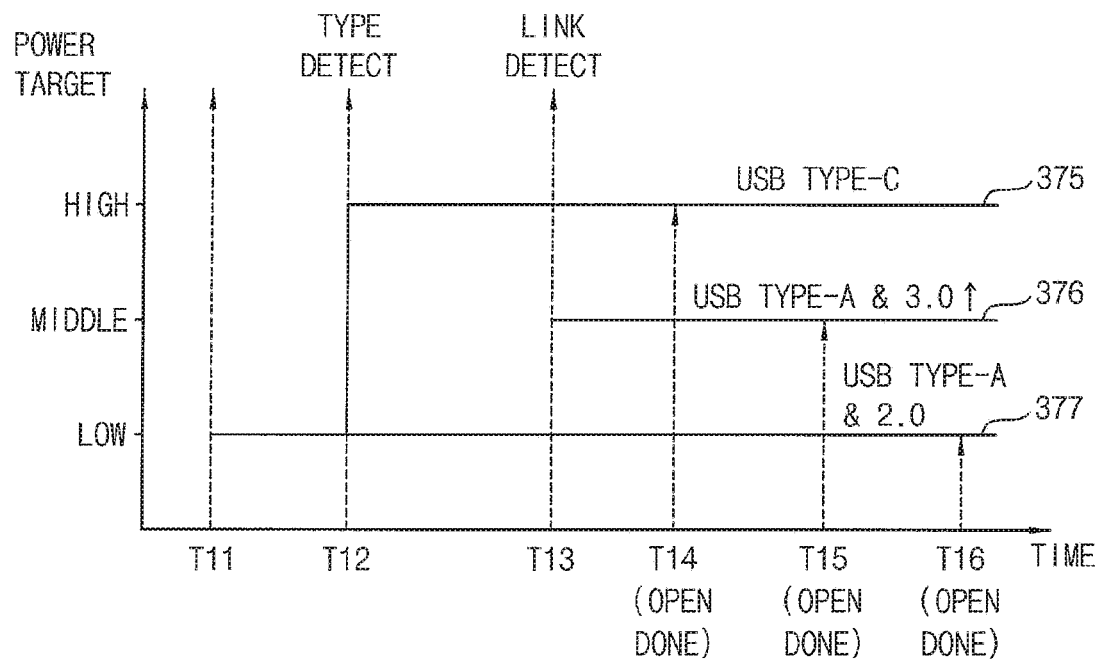
FIG. 11 is a timing diagram illustrating an operation of a storage controller in FIG. 5 according to exemplary embodiments.

FIG. 11 is a timing diagram illustrating an initializing operation of the storage controller 300 in FIG. 5 according to exemplary embodiments.

Referring to FIGS. 5 through 9 and 11, when power is applied to the portable storage device 200 at a first time point T11, the connection detector 240 detects a resistance of the cable assembly 30 by detecting the voltage of the CC1 pin 212 to determine a USB type of the cable assembly 30. The USB type of the cable assembly 30 may be detected at a second time point T12.

When the USB type of the cable assembly 30 corresponds to USB type-C as reference numeral 375 indicates, open operation is done at a fourth time point T14. In this case, the power target is set to the second power target (HIGH).

The connection detector 240 detects USB version information of the cable assembly at a third time point T13.

When the USB type of the cable assembly 30 corresponds to USB type-A and the USB version information of the cable assembly 30 corresponds to USB 3.0 higher as reference numeral 376 indicates, open operation is done at a fifth time point T15. In this case, the power target is set to the third power target (MIDDLE).

When the USB type of the cable assembly 30 corresponds to USB type-A and the USB version information of the cable assembly 30 corresponds to USB 2.0 as reference numeral 377 indicates, open operation is done at a sixth time point T16. In this case, the power target is set to the first power target (LOW).

Figure 12:
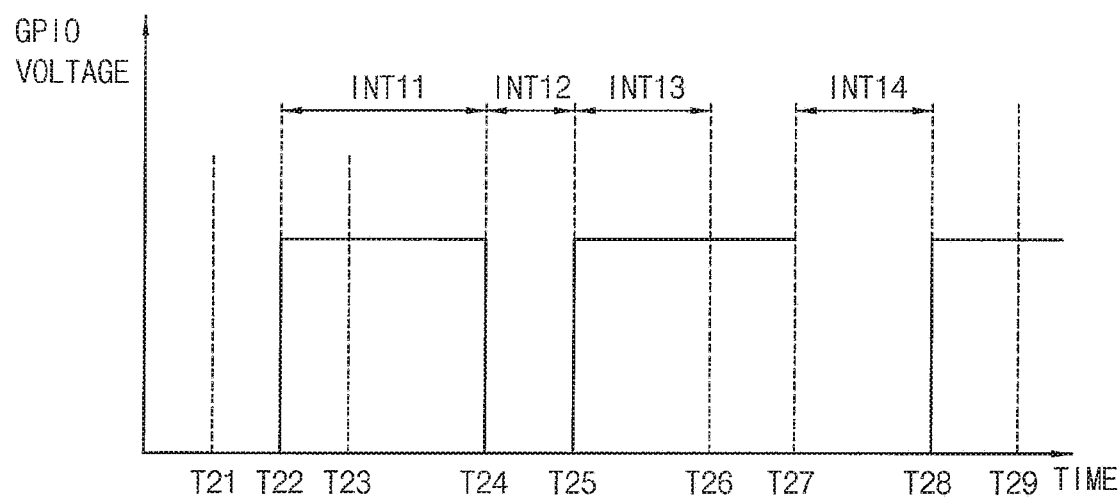
FIG. 12 illustrates an operation of a connection detector in FIG. 5 according to exemplary embodiments.

FIG. 12 illustrates an operation of the connection detector 240 in FIG. 5 according to exemplary embodiments.

Referring to FIGS. 5 through 9 and 12, power is applied to the portable storage device 200 at a first time point T21.

The bridge chipset 220 (the connection detector 240) operates to maintain a voltage of the first GPIO pin 221 with a first level (high level) during a first time interval INT11 from a second time point T22 to a fourth time point T24 after the power is applied. At a third time point T23 in the first time interval INT11, reset of the storage controller 300 is released, and the storage controller 300 starts to operate. The bridge chipset 220 changes the voltage level of the first GPIO pin 221 to a second level different from the first level at the fourth time point T24, maintains the voltage level of the first GPIO pin 221 with the second logic level (low level) during a second time interval INT12 from the fourth time point T24 to a fifth time point T25, and changes the voltage level of the first GPIO pin 221 to the first logic level at the fifth time point T25.

The power controller 360 prepares for detecting a voltage of the second GPIO pin 301 in response to the voltage of the second GPIO pin 301 changing to the first level at the fifth time point T25, and the power controller 360 determines the USB type of the cable assembly 30 based on the voltage level of the second GPIO pin 301 after the third time interval INT13 from the fifth time point T25 to a sixth time point T26 elapses.

When the voltage of the CC1 pin 212 is smaller than or equal to the threshold value, the connection detector 240 may notify the storage controller 300 of the USB type of the first connector 110 being USB type-C by maintaining the voltage level of the first GPIO pin 221 with the first level during the third time interval INT13.

When the voltage of the CC1 pin 212 is greater than the threshold value, the connection detector 240 may notify the storage controller 300 of the USB type of the first connector 110 being USB type-A by changing the voltage level of the first GPIO pin 221 to the second level and maintaining the voltage level of the first GPIO pin 221 with the second level during the third time interval INT13.

During a fourth time interval INT14 from a seventh time point T27 to an eighth time point T28, the connection detector 240 changes or maintains the voltage level of the first GPIO pin 221 to or at the second level, changes the voltage level of the first GPIO pin 221 to the first logic level, and writes the USB version information UVI in the register 352 in the PCIe interface 351 at the eighth time point T28. The storage controller 300 determines the USB version of the first connector 110 in response to a write event in the register 352 at a ninth time point T29. That is, the connection detector 240 may notify the storage controller 300 of the USB type of the first connector 110 and/or the cable assembly 30 by changing the voltage level of the first GPIO pin 221 to the first level or by maintaining the voltage level of the first GPIO pin 221 at the second level during the third time interval INT13.

Figure 13:
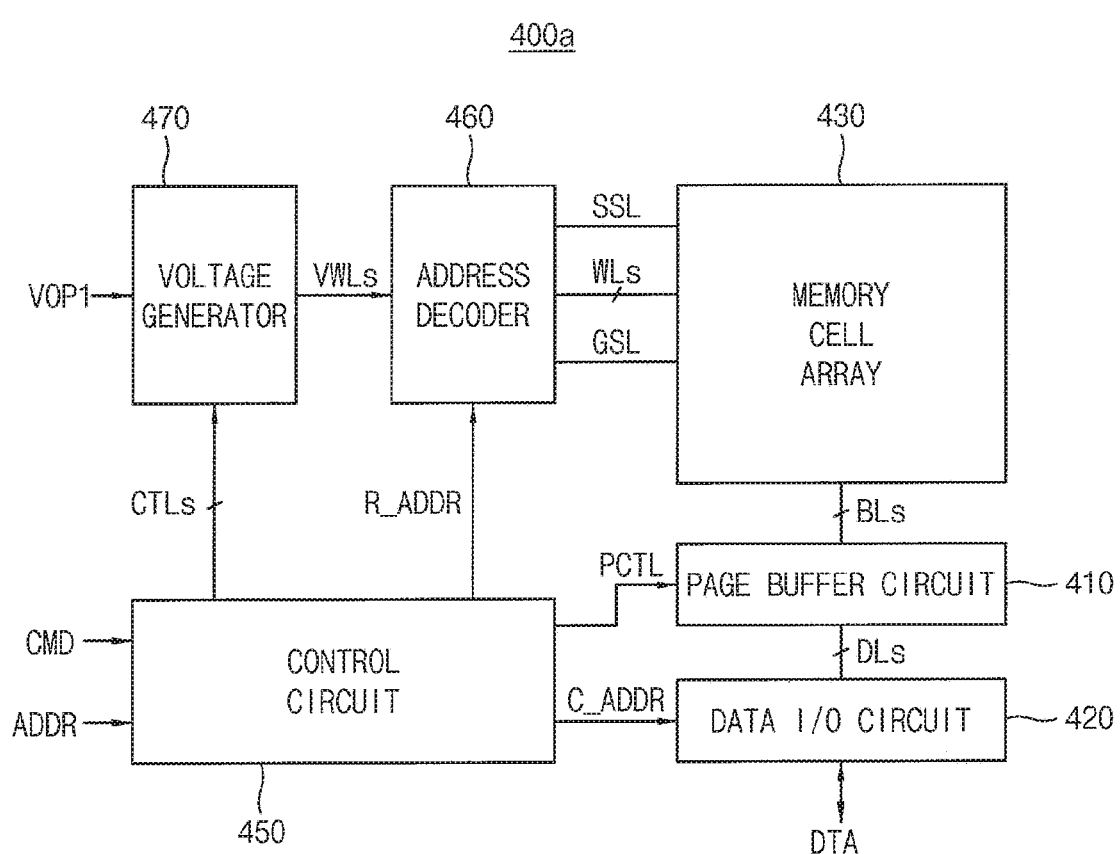
FIG. 13 is a block diagram illustrating one of a plurality of nonvolatile memory devices in the portable storage device in FIG. 5 according to exemplary embodiments.

A time interval from a time point when the power is applied to the ninth time point T29 may correspond to an interval reference time interval and the internal reference time interval may be smaller than or equal to 10 seconds FIG. 13 is a block diagram illustrating one of the nonvolatile memory devices 400a in the portable storage device 200 in FIG. 5 according to exemplary embodiments. For convenience of illustration, FIG. 13 illustrates only the nonvolatile memory device 400a. In exemplary embodiments, each of the nonvolatile memory devices 400a~400k in the portable storage device 200 in FIG. 5 may have the configuration shown in FIG. 13.

Referring to FIG. 13, the nonvolatile memory device 400a includes a memory cell array 430, an address decoder 460, a page buffer circuit 410, a data input/output circuit 420, a control circuit 450, and a voltage generator 470.

The memory cell array 430 may be coupled to the address decoder 460 through a string selection line SSL, a plurality of word lines WLs, and a ground selection line GSL. In addition, the memory cell array 430 may be coupled to the page buffer circuit 410 through a plurality of bit lines BLs. The memory cell array 430 may include a plurality of memory cells coupled to the plurality of word lines WLs and the plurality of bit lines BLs. The memory cell array 430 may include a plurality of memory cells coupled to the plurality of word lines WLs stacked in a vertical direction, which is perpendicular to a substrate.

Figure 14:
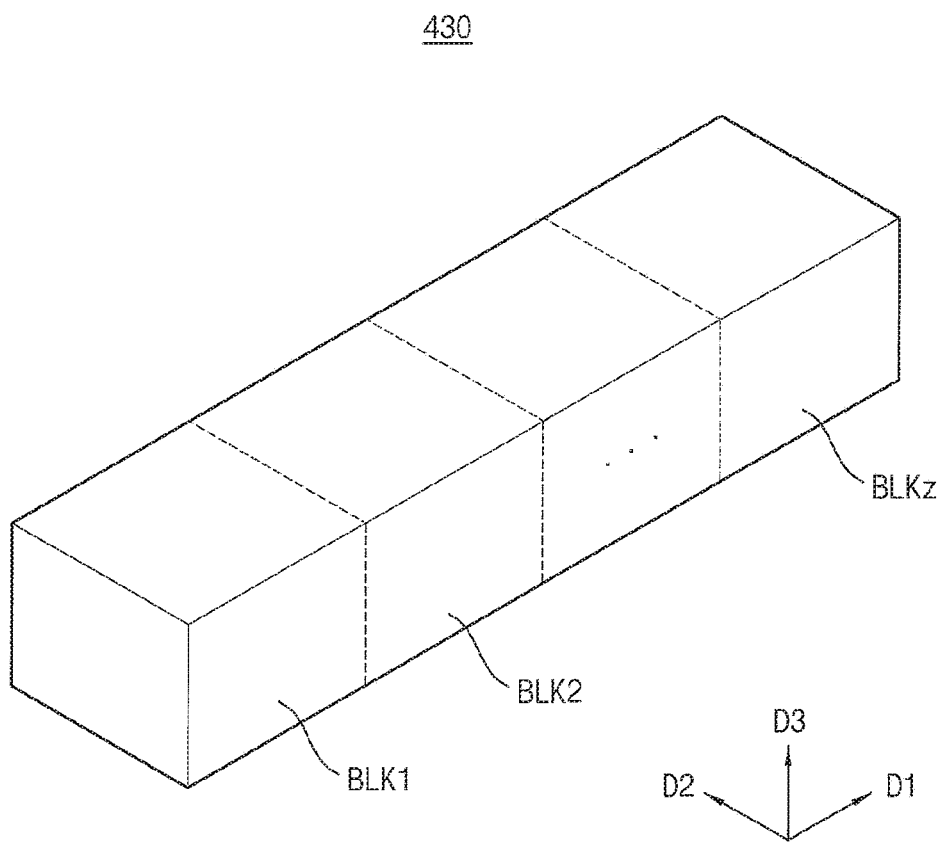
FIG. 14 is a block diagram illustrating a memory cell array in FIG. 13 according to exemplary embodiments.

FIG. 14 is a block diagram illustrating the memory cell array 430 in FIG. 13 according to exemplary embodiments.

Referring to FIG. 14, the memory cell array 430 may include a plurality of memory blocks BLK1 to BLKz (where z is an integer greater than two). In an exemplary embodiment, the memory blocks BLK1 to BLKz are selected by the address decoder 460 in FIG. 13. For example, the address decoder 460 may select a memory block BLK corresponding to a block address among the memory blocks BLK1 to BLKz.

Figure 15:
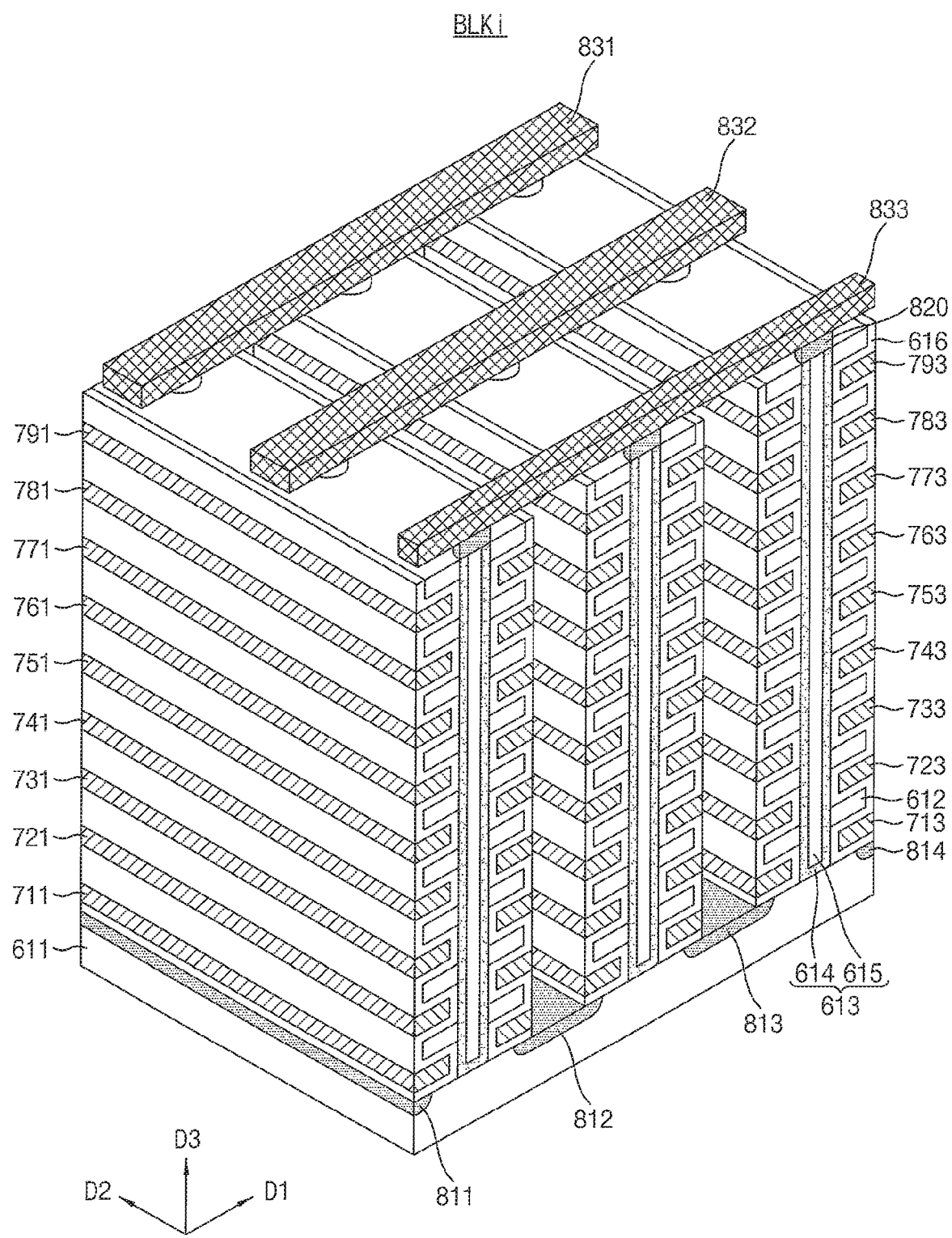
FIG. 15 is a perspective view illustrating one of a plurality of memory blocks of FIG. 14 according to exemplary embodiments.

FIG. 15 is a perspective view illustrating one of the memory blocks BLK1 to BLKz of FIG. 14 according to exemplary embodiments. In exemplary embodiments, each of the memory blocks BLK1 to BLKz of FIG. 14 may have the configuration of the memory block BLKi shown in FIG. 15.

Referring to FIG. 15, a memory block BLKi includes structures extending along the first to third directions D1~D3.

A substrate 611 is provided. For example, the substrate 611 may have a well of a first type (e.g., a first conductive type). For example, the substrate 611 may have a p-well formed by implanting a group 3 element such as boron (B). A plurality of doping regions 811 to 814 extending along the first direction D1 are provided in/on the substrate 611. For example, the plurality of doping regions 811 to 814 may have a second type (e.g., a second conductive type) different from the first type of the substrate 611. In an exemplary embodiment, the first to fourth doping regions 811 to 814 have an n-type.

A plurality of insulation materials 612 extending along the second direction D2 are sequentially provided along the third direction D3 in a region of the substrate 611 between the first and second doping regions 811 and 812. For example, the plurality of insulation materials 612 may be provided along the third direction D3 and spaced by a specific distance. Exemplarily, the insulation materials 612 may include an insulation material such as an oxide layer. However, the insulation materials 612 are not limited thereto.

A plurality of pillars 613 penetrating the insulation materials 612 along the third direction D3 are sequentially disposed along the second direction D2 in a region of the substrate 611 between the first and second doping regions 811 and 812. For example, the plurality of pillars 613 may penetrate the insulation materials 612 to contact the substrate 611.

For example, each pillar 613 may include a plurality of materials. For example, a channel layer 614 of each pillar 613 may include a silicon material having a first type. For example, the channel layer 614 of each pillar 613 may include a silicon material having the same type as the substrate 611. In an exemplary embodiment, the channel layer 614 of each pillar 613 includes a p-type silicon. An internal material 615 of each pillar 613 includes an insulation material. For example, the internal material 615 of each pillar 613 may include an insulation material such as a silicon oxide. However, the internal material 615 is not limited thereto. For example, the internal material 615 of each pillar 613 may include an air gap.

An insulation layer 616 is provided along the exposed surfaces of the insulation materials 612, the pillars 613, and the substrate 611, in a region between the first and second doping regions 811 and 812. Exemplarily, the insulation layer 616 provided on the exposed surface in the third direction D3 of the last insulation material 612 may be removed.

A plurality of first conductive materials 711 to 791 is provided between the second doping regions 811 and 812 on the exposed surfaces of the insulation layer 616. For example, the first conductive material 711 extending along the second direction D2 is provided between the substrate 611 and the insulation material 612 adjacent to the substrate 611.

A first conductive material extending along the first direction D1 is provided between the insulation layer 616 at the top of a specific insulation material among the insulation materials 612 and the insulation layer 616 at the bottom of a specific insulation material 612 among the insulation materials 612. For example, a plurality of first conductive materials 721 to 781 extending along the first direction D1 are provided between the insulation materials 612, and it may be understood that the insulation layer 616 is provided between the insulation materials 612 and the first conductive materials 721 to 781. The first conductive materials 721 to 791 may include a metal material.

The same structures as those on the first and second doping regions 811 and 812 may be provided in a region between the second and third doping regions 812 and 813. In the region between the second and third doping regions 812 and 813, provided are a plurality of insulation materials 612 extending along the first direction D1, a plurality of pillars 613 disposed sequentially along the first direction D1 and penetrating the plurality of insulation materials 612 along the third direction D3, an insulation layer 616 provided on the exposed surfaces of the plurality of insulation materials 612 and the plurality of pillars 613, and a plurality of conductive materials 713 to 793 extending along the first direction D1.

In a region between the third and fourth doping regions 813 and 814, the same structures as those on the first and second doping regions 811 and 812 may be provided. In the region between the third and fourth doping regions 813 and 814, provided are a plurality of insulation materials 612 extending along the first direction D1, a plurality of pillars 613 disposed sequentially along the first direction D1 and penetrating the plurality of insulation materials 612 along the third direction D3, an insulation layer 616 provided on the exposed surfaces of the plurality of insulation materials 612 and the plurality of pillars 613, and a plurality of first conductive materials 713 to 793 extending along the first direction D1.

Drains 820 are provided on the plurality of pillars 613, respectively. On the drains 820, the second conductive materials 831 to 833 extending along the first direction D1 are provided. The second conductive materials 831 to 833 are disposed along the second direction D2 and are spaced by a specific distance. The second conductive materials 831 to 833 are respectively connected to the drains 820 in a corresponding region. The drains 820 and the second conductive material 833 extending along the first direction D1 may be connected through each contact plug. The second conductive materials 831 to 833 may include metal materials. The second conductive materials 831 to 833 may include conductive materials such as a polysilicon. However, the second conductive materials 831 to 833 are not limited thereto.

Figure 16:
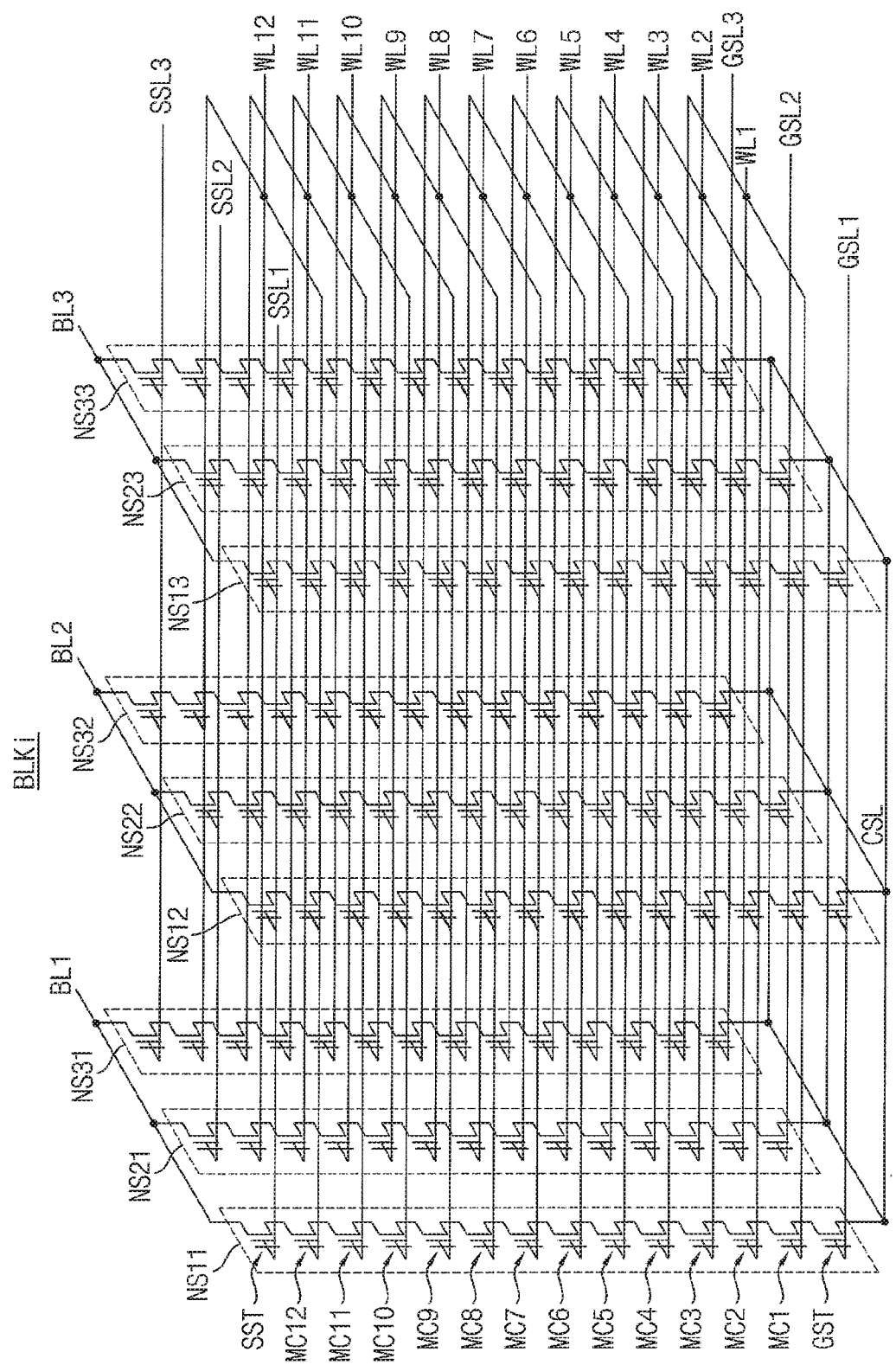
FIG. 16 is an equivalent circuit diagram illustrating the memory block of FIG. 15 according to exemplary embodiments.

FIG. 16 is an equivalent circuit diagram illustrating the memory block BLKi of FIG. 15 according to exemplary embodiments.

The memory block BLKi of FIG. 16 may be formed on a substrate in a three-dimensional structure (or a vertical structure). For example, a plurality of memory cell strings included in the memory block BLKi may be formed in a direction perpendicular to the substrate.

Referring to FIG. 16, the memory block BLKi may include memory cell strings NS11 to NS33 coupled between bit lines BL1, BL2 and BL3 and a common source line CSL. Each of the memory cell strings NS11 to NS33 may include a string selection transistor SST, a plurality of memory cells MC1 to MC12, and a ground selection transistor GST.

The string selection transistor SST may be connected to corresponding string selection lines SSL1 to SSL3. The plurality of memory cells MC1 to MC12 may be connected to corresponding word lines WL1 to WL12, respectively. The ground selection transistor GST may be connected to corresponding ground selection lines GSL1 to GSL3. The string selection transistor SST may be connected to corresponding bit lines BL1, BL2 and BL3, and the ground selection transistor GST may be connected to the common source line CSL.

Word lines (e.g., WL1) having the same height may be commonly connected, and the ground selection lines GSL1 to GSL3 and the string selection lines SSL1 to SSL3 may be separated.

Referring back to FIG. 13, the control circuit 450 may receive the command (signal) CMD and the address (signal) ADDR from the storage controller 300 and control an erase operation, a program operation and a read operation of the nonvolatile memory device 400*a* based on the command signal CMD and the address signal ADDR.

For example, the control circuit 450 may generate control signals CTLs, which are used for controlling the voltage generator 470, based on the command signal CMD, and may generate a row address R_ADDR and a column address C_ADDR based on the address signal ADDR. The control circuit 450 may provide the row address R_ADDR to the address decoder 460 and provide the column address C_ADDR to the data input/output circuit 420. In addition, the control circuit 450 may generate a control signal PCTL, which is used for controlling the page buffer circuit 410.

The address decoder 460 may be coupled to the memory cell array 430 through the string selection line SSL, the plurality of word lines WLs, and the ground selection line GSL.

The voltage generator 470 may generate word line voltages VWLs using the first operation voltage VOP1, which are used for the operation of the nonvolatile memory device 400*a*, based on the control signals CTLs. The word line voltages VWLs may be applied to the plurality of word lines WLs through the address decoder 460.

The page buffer circuit 410 may be coupled to the memory cell array 430 through the plurality of bit lines BLs. The page buffer circuit 410 may include a plurality of page buffers. In exemplary embodiments, one page buffer may be connected to one bit line, or one page buffer may be connected to two or more bit lines. The page buffer circuit 410 may temporarily store data to be programmed in a selected page or data read out from the selected page. The page buffer circuit 410 may be controlled in response to the control signal PCTL from the control circuit 450.

The data input/output circuit 420 may be coupled to the page buffer circuit 410 through data lines DLs. During the program operation, the data input/output circuit 420 may receive program data DTA from the storage controller 300 and provide the program data DTA to the page buffer circuit 410 based on the column address C_ADDR received from the control circuit 450. During the read operation, the data input/output circuit 420 may provide read data DTA, which are stored in the page buffer circuit 410, to the storage controller 300 based on the column address C_ADDR received from the control circuit 450.

Figure 17:
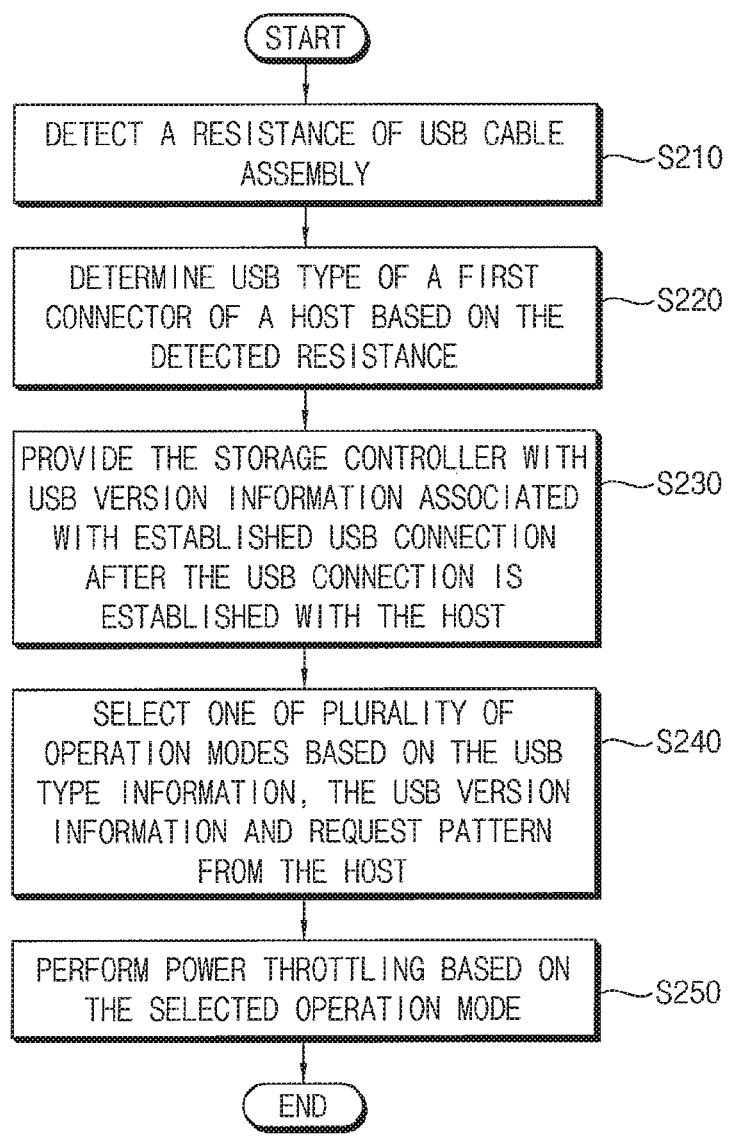
FIG. 17 is a flowchart illustrating a method of operating a portable storage device according to exemplary embodiments.

FIG. 17 is a flowchart illustrating a method of operating a portable storage device according to exemplary embodiments.

Referring to FIGS. 1 through 17, there is provided a method of operating a portable storage device 200 which includes a plurality of nonvolatile memory devices 400a~400k to store data, a storage controller 300 to control the plurality of nonvolatile memory devices 400a~400k, and a bridge chipset 220 connected to a first connector 110 of a host 100 through a cable assembly 30 connected to a second connector 210 of the bridge chipset 220.

According to the method in an exemplary embodiment, the bridge chipset 220 detects a resistance of the cable assembly 30 when power is applied to the portable storage device 200 (S210). A connection detector 240 in the bridge chipset 220 detects the resistance of the cable assembly 30 by detecting a voltage of the CC1 pin 212 of the second connector 210.

The connection detector 240 in the bridge chipset 220 determines the USB type of the first connector 110 based on the detected resistance (S220), and provides the power controller 360 in the storage controller 300 with USB type information UTI associated with the USB type of the first connector 110. The connection detector 240 in the bridge chipset 220 provides the storage controller 300 with USB version information UVI associated with an established USB connection after the USB connection is established between the portable storage device 200 and the host 100 (S230).

The power controller 360 selects one of a plurality of operation modes based on the USB type information UTI, the USB version information UVI, and a request pattern which is based on the command and the address (S240). For example, the power controller 360 selects one of the sub-tables 370a, 370b and 370c based on the USB type information UTI and the USB version information UVI, and selects one of the plurality of operation modes in the selected sub-table based on the request pattern.

The power controller 360 performs power throttling based on the selected operation mode such that a power target level associated with the selected initializing mode is not exceeded (S250).

The power throttling may be associated with selecting frequencies of clock signals having high performance to be provided to hardware elements such as the cores 311, 312 and 313, the system bus 305, and the nonvolatile controller 345 according to the USB type information, the USB version information, and the request pattern such that a power target level associated with the selected operation mode is not exceeded.

Therefore, the portable storage device 200 may optimize power by adaptively controlling power based on the USB type of the first connector 110 of the host 100, connected through the cable assembly, USB version information between the portable storage device 200 and the host 100, and the request pattern from the host 100.

Figure 18:
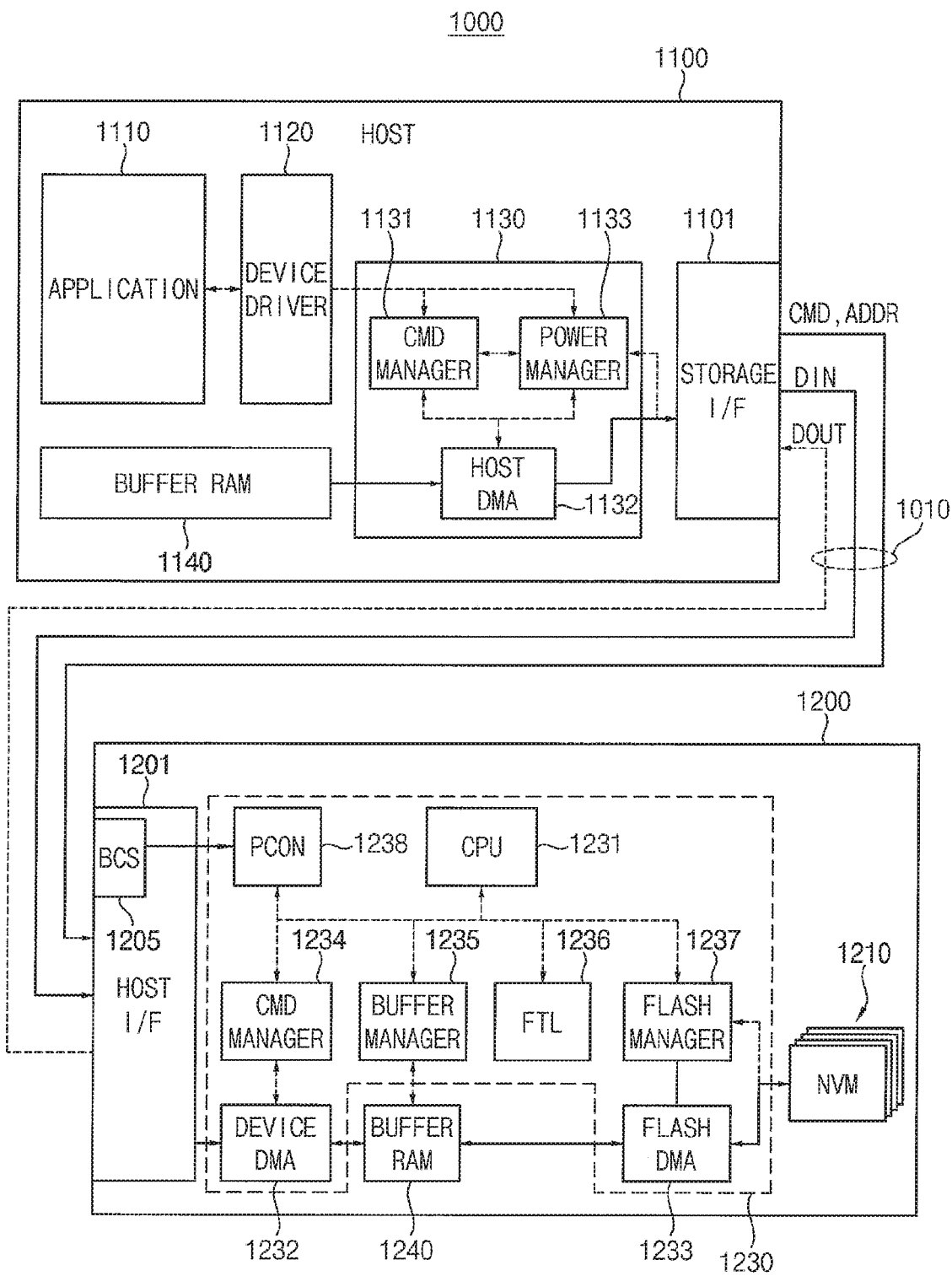
FIG. 18 is a block diagram illustrating a storage system according to exemplary embodiments.

FIG. 18 is a block diagram illustrating a storage system according to exemplary embodiments.

Referring to FIG. 18, a storage system 1000 includes a host 1100 and a portable storage device 1200.

The host 1100 and the portable storage device 1200 may be connected to each other through a cable assembly 1010.

The host 1100 includes an application 1110, a device driver 1120, a host controller 1130, a buffer random access memory (RAM) 1140, and a storage interface 1101. The host controller 1130 includes a command manager 1131, a host direct memory access (DMA) 1132, and a power manager 1133.

In operation, a system level command (e.g., a write command) is generated by the application 1110 and device driver 1120 of the host 1100, and is then provided to the command manager 1131 of the host controller 1130.

The command manager 1131 may be used to generate a corresponding portable storage device command (e.g., a corresponding command or set of commands consistent with a protocol being implemented by the storage system 1000) that is provided to the portable storage device 1200 using the device driver 1120.

The command generated by the command manager 1131 may also be provided to the host DMA 1132, which sends the command to the portable storage device 1200 via the storage interface 1101. The storage interface 1101 may include a first connector such as the first connector 110 and may be connected to the cable assembly 1010 through the first connector 110.

The portable storage device 1200 includes nonvolatile memory devices 1210, a device controller 1230, a buffer RAM 1240, and a host interface 1201. The device controller 1230 may include a central processing unit (CPU) 1231, a device DMA 1232, a flash DMA 1233, a command manager 1234, a buffer manager 1235, a flash translation layer (FTL) 1236, a flash manager 1237, and a power controller 1238.

A command transferred from the host 1100 to the portable storage device 1200 may be provided to the device DMA 1232 via the host interface 1201. The host interface 1201 may include a second connector such as the second connector 210 and a bridge chipset 1205. The bridge chipset 1205 may employ the bridge chipset 220 in FIG. 5.

The device DMA 1232 may then communicate the received command to the command manager 1234. The command manager 1234 may be used to allocate memory space in the buffer RAM 1240 to receive corresponding write data via the buffer manager 1235. Once the portable storage device 1200 is ready to receive the write data, the command manager 1234 may communicate a transmission "ready" signal to the host 1100.

Upon receiving the transmission ready signal, the host 1100 will communicate the write data to the portable storage device 1200. The write data may be sent to the portable storage device 1200 using the host DMA 1132 and storage interface 1101.

The portable storage device 1200 may then store the received write data in the buffer RAM 1240 using the device DMA 1232 and buffer manager 1235. The write data stored in the buffer RAM 1240 may then be provided to the flash manager 1237 via the flash DMA 1233. The flash manager 1237 may be used to program the write data according to addresses for the nonvolatile memory devices 1210 derived from an address mapping table by the flash translation layer 1236.

Once the transfer and programming of the write data is complete, the portable storage device 1200 may send a response to the host 1100 informing the host 1100 that the write command has been successfully executed. Based on the received response signal, the host 1100 indicates to the device driver 1120 and application 1110 that the command is complete, and will thereafter terminate execution of the operation corresponding to the command.

As described above, the host 1100 and portable storage device 1200 may exchange data and corresponding control signal(s) (e.g., the ready and response signals) via data lines of the data segment (e.g., data lines DIN and DOUT). In addition, the host 1100 may provide a command CMD and an address ADDR to the portable storage device 1200.

The power controller 1238 may employ the power controller 360 in FIG. 8.

Therefore, in the portable storage device 1200 in the storage system 1000, the bridge chipset 1205 may detect a resistance of the cable assembly 1010 in response to power being applied to the portable storage device 1200 from the host 1100 through the cable assembly 1010, and may determine a USB type of the first connector 110 based on the detected resistance.

In addition, the portable storage device 1200 may obtain USB version information when a USB connection is established between the host 1100 and the portable storage device 1200. The power controller 1238 may select one of a plurality of operation modes based on the USB type, the USB version information, and the request pattern from the host 1100, and may perform power throttling based on the selected operation mode. Therefore, the portable storage device 1200 may improve performance by adaptively controlling power.

A portable storage device or a storage system according to exemplary embodiments may be packaged using various package types or package configurations.

Exemplary embodiments of the present disclosure may be applied to various portable storage devices and various electronic devices connected to the portable storage devices.

As is traditional in the field of the present disclosure, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the exemplary embodiments may be physically separated into two or more interacting and discrete blocks, units and/or modules without departing from the scope of the invention. Further, the blocks, units and/or modules of the exemplary embodiments may be physically combined into more complex blocks, units and/or modules without departing from the scope of the present disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "unit" or "system." Furthermore, aspects of the present disclosure may take the form of a computer program product embodied in one or more computer readable medium(s) having computer readable program code embodied thereon. If implemented in software, the functions may be stored on or transmitted over as one or more instructions or code on a tangible, non-transitory computer-readable medium.

Herein, the term "circuit" may refer to an analog circuit or a digital circuit. In the case of a digital circuit, the digital circuit may be hard-wired to perform the corresponding tasks of the circuit, such as a digital processor that executes instructions to perform the corresponding tasks of the circuit. Examples of such a processor include an application-specific integrated circuit (ASIC) and a field-programmable gate array (FPGA).

In an exemplary embodiment of the present disclosure, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. In an exemplary embodiment of the present disclosure, the 3D memory array includes vertical NAND strings that are vertically oriented such that at least one memory cell is located over another memory cell. The at least one memory cell may include a charge trap layer. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

While the present disclosure has been particularly shown and described with reference to the exemplary embodiments thereof, it will be understood by those of ordinary skill in the art that various changes in form and detail may be made therein without departing from the spirit and scope of the present disclosure as defined by the following claims.

What is claimed is:

1. A portable storage device, comprising:
   a plurality of nonvolatile memory devices configured to store data;
   a storage controller configured to control the plurality of nonvolatile memory devices; and
   a bridge chipset connected to a first connector of a host through a cable assembly,
   wherein the bridge chipset is configured to:
   detect a resistance of the cable assembly;

provide the storage controller with universal serial bus (USB) type information of the first connector based on the detected resistance; and after a USB connection is established with the host, provide the storage controller with USB version information associated with the established USB connection, wherein the storage controller is configured to:

select one of a plurality of operation modes based on the USB type information, the USB version information, and a request pattern indicating random access to the data or sequential access to the data from the host;

select clock signals having maximum frequencies in a range within a maximum power level associated with the selected operation mode; and perform power throttling based on the selected clock signals.

2. The portable storage device of claim 1, wherein:

the bridge chipset comprises a connection detector configured to detect the resistance of the cable assembly via a first pin of a plurality of pins in a second connector of the portable storage device, wherein the second connector is connected to the cable assembly, and the first pin corresponds to a first configuration channel (CC) pin from among the plurality of pins in the second connector;

the first CC pin is used for at least one of detecting a connection of the portable storage device, determining an insertion direction of a plug, and managing a configuration of the portable storage device and the host through the cable assembly; and the bridge chipset is configured to provide the USB type information to the storage controller through a first general purpose input/output (GPIO) pin.

3. The portable storage device of claim 2, wherein the connection detector is configured to:

maintain a voltage level of the first GPIO pin hard-wired to a second GPIO pin of the storage controller at a first level during a first time interval after a power is applied;

change the voltage level of the first GPIO pin to a second level different from the first level during a second time interval successive to the first time interval; and change the voltage level of the first GPIO pin to the first level at a time point in a third time interval successive to the second time interval, wherein the storage controller is configured to:

determine the USB type information based on a voltage level of the second GPIO pin after the third time interval elapses;

write the USB type information in a register in the storage controller within a fourth time interval after the third time interval; and determine the USB version information in response to a write event in the register.

4. The portable storage device of claim 3, wherein the connection detector is configured to notify the storage controller that a USB type of the first connector is USB type-C by maintaining the voltage level of the first GPIO pin at the first level during the third time interval based on a comparison of a voltage of the first CC pin with a threshold value.

5. The portable storage device of claim 3, wherein the connection detector is configured to notify the storage controller that a USB type of the first connector is USB type-A by changing the voltage level of the first GPIO pin from the first level to the second level during the third time interval based on a comparison of a voltage of the first CC pin with a threshold value.

6. The portable storage device of claim 1, wherein the storage controller comprises:

an interface unit configured to perform interfacing between the host and the nonvolatile memory devices; and a power controller configured to select one of the plurality of operation modes based on the USB type information, the USB version information, and the request pattern to perform the power throttling, wherein a connection detector disposed in the bridge chipset is configured to:

provide the USB type information to the storage controller through a first general purpose input/output (GPIO) pin of the connection detector, wherein the first GPIO pin is hard-wired to a second GPIO pin of the storage controller; and write the USB version information in a register in a peripheral component interconnect express (PCIe) interface in the interface unit.

7. The portable storage device of claim 6, wherein:

the bridge chipset and the storage controller are configured to communicate with each other via side-band communication through the first GPIO pin and the second GPIO pin, respectively; and the connection detector and the register in the PCIe interface are configured to communicate with each other via in-band communication and through a non-nonvolatile memory express (NVMe) interface.

8. The portable storage device of claim 6, wherein the power controller is configured to:

select the clock signals having the maximum frequencies based on the USB type information, the USB version information in the register, and the request pattern; and perform the power throttling to adjust a level of power consumed in the selected operation mode.

9. The portable storage device of claim 6, wherein:

the power controller comprises a look-up table comprising a plurality of sub-tables that store information on power targets associated with the plurality of operation modes, respectively, according to the USB type information, the USB version information in the register, and the request pattern;

the power controller is configured to select one of the plurality of sub-tables based on the USB type information and the USB version information; and the power controller is configured to select one of a plurality of entries in the selected sub-table based on the request pattern to perform the power throttling.

10. The portable storage device of claim 9, wherein the power controller is configured to:

select one of the plurality of sub-tables; and perform the power throttling by selecting an entry corresponding to the request pattern, from among entries of the selected sub-table, in response to the USB type information indicating that a USB type of the first connector corresponds to USB type-C.

11. The portable storage device of claim 9, wherein the power controller is configured to:

determine whether the USB version information corresponds to USB 3.0 or higher in response to the USB type information indicating that the first connector does not correspond to USB type-C;

select one of the plurality of sub-tables; and perform the power throttling by selecting an entry corresponding to the request pattern, from among entries of the selected sub-table, in response to the USB version information corresponding to USB 3.0 or higher.

12. The portable storage device of claim 9, wherein the power controller is configured to:
   determine whether the USB version information corresponds to USB 3.0 or higher in response to the USB type information indicating that the first connector does not correspond to USB type-C;
   select one of the plurality of sub-tables; and
   perform the power throttling by selecting an entry corresponding to the request pattern, from among entries of the selected sub-table, in response to the USB version information not corresponding to USB 3.0 or higher.

13. The portable storage device of claim 9, wherein the storage controller comprises a plurality of cores configured to perform control operations associated with the nonvolatile memory devices,
   wherein the power controller comprises:
      a clock generator configured to generate base clock signals and divided clock signals by dividing the base clock signals, and to provide the plurality of cores with the base clock signals and the divided clock signals as the selected clock signals;
      a selection circuit configured to select the selected clock signals provided to the plurality of cores in response to selection signals; and
      a control logic configured to generate the selection signals based on the USB type information, the USB version information, and the request pattern.

14. The portable storage device of claim 13, wherein the control logic comprises:
   a first detector configured to generate a table selection signal for selecting one of the sub-tables based on the USB type information and the USB version information;
   a second detector configured to detect the request pattern based on a command and an address from the host, and to generate an entry selection signal for selecting one of a plurality of entries of the selected sub-table; and
   a selection signal generator configured to generate the selection signals by referring to the selected entry of the selected sub-table.

15. The portable storage device of claim 14, wherein the control logic is further configured to generate the selection signals such that clock signals having frequencies associated with an operation mode corresponding to a maximum power target from among the plurality of operation modes are selected, in response to the USB type information indicating that the first connector corresponds to USB type-C.

16. The portable storage device of claim 14, wherein the control logic is further configured to generate the selection signals such that clock signals having frequencies associated with an operation mode corresponding to an intermediate power target from among the plurality of operation modes are selected, in response to the USB type information indicating that the first connector does not correspond to USB type-C and the USB version information corresponding to USB 3.0 or higher,
   wherein the intermediate power target is greater than a minimum power target and is smaller than a maximum power target.

17. The portable storage device of claim 1, wherein each of the plurality of nonvolatile memory devices comprises a memory cell array, and the memory cell array comprises a plurality of memory cells coupled to a plurality of word lines stacked in a vertical direction that is perpendicular to a substrate.

18. A method of operating a portable storage device, comprising:
   detecting, in a bridge chipset, a resistance of a cable assembly,
   wherein the portable storage device comprises a plurality of nonvolatile memory devices configured to store data, a storage controller configured to control the plurality of nonvolatile memory devices, and the bridge chipset connected to a first connector of a host through the cable assembly connected to a second connector of the bridge chipset;
   determining universal serial bus (USB) type information of the first connector based on the detected resistance;
   providing USB version information associated with an established USB connection to the storage controller after the USB connection is established between the host and the portable storage device;
   selecting, in the storage controller, one of a plurality of operation modes based on the USB type information, the USB version information, and a request pattern indicating random access to the data or sequential access to the data from the host; and
   performing power throttling based on the selected operation mode.

19. The method of claim 18, wherein the bridge chipset is configured to:
   provide the USB type information to the storage controller through a first general purpose input/output (GPIO) pin; and
   write the USB version information in a register in a peripheral component interconnect express (PCIe) interface in an interface unit included in the storage controller.

20. A portable storage device, comprising:
   a plurality of nonvolatile memory devices configured to store data;
   a storage controller configured to control the plurality of nonvolatile memory devices; and
   a bridge chipset connected to a first connector of a host through a cable assembly,
   wherein the bridge chipset is configured to:
      detect a resistance of the cable assembly;
      provide the storage controller with connection information of the first connector based on the detected resistance; and
      after a connection is established with the host, provide the storage controller with version information associated with the established connection,
   wherein the storage controller is configured to:
      select one of a plurality of operation modes based on USB type information, USB version information, and a request pattern indicating random access to the data or sequential access to the data from the host;
      select clock signals having maximum frequencies in a range within a maximum power level associated with the selected operation mode; and
      perform power throttling based on the selected clock signals.

* * * * *